(12) United States Patent
Mannion et al.

(10) Patent No.: US 6,936,650 B2
(45) Date of Patent: *Aug. 30, 2005

(54) NUCLEATING ADDITIVE FORMULATIONS OF BICYCLO[2.2.1]HEPTANE DICARBOXYLATE SALTS

(75) Inventors: Michael J. Mannion, Spartanburg, SC (US); Jeffrey R. Jones, Inman, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/679,217

(22) Filed: Oct. 3, 2003

(65) Prior Publication Data

US 2005/0075433 A1 Apr. 7, 2005

(51) Int. Cl.⁷ .................................................. C08L 5/09
(52) U.S. Cl. ...................... 524/285; 524/321; 524/394; 524/397; 524/400; 524/492; 524/445; 524/451
(58) Field of Search ................................. 524/285, 321, 524/394, 400, 584, 582, 583, 492, 451, 445

(56) References Cited

U.S. PATENT DOCUMENTS

| | | | |
|---|---|---|---|
| 3,201,323 A | 8/1965 | Spurlin et al. | 260/30.4 |
| 3,207,736 A | 9/1965 | Wijga et al. | 260/93.7 |
| 3,234,233 A | 2/1966 | Bolger et al. | 260/326 |
| 3,320,267 A | 5/1967 | Poos et al. | 260/295 |
| 3,367,926 A | 2/1968 | Voeks et al. | 260/93.5 |
| 3,527,736 A | 9/1970 | Averink et al. | 260/78.4 |
| 3,793,401 A | 2/1974 | Nield et al. | 260/876 R |
| 3,829,450 A | 8/1974 | Schmerling et al. | 260/346.3 |
| 3,873,643 A | 3/1975 | Wu et al. | 260/878 R |
| 3,882,194 A | 5/1975 | Krebaum et al. | 260/878 R |
| 3,928,687 A | 12/1975 | Wada et al. | 428/461 |
| 3,933,779 A | 1/1976 | Baron et al. | 260/93.5 |
| 3,941,746 A | 3/1976 | Stephen et al. | 260/45.8 |
| 3,954,913 A | 5/1976 | Uebele et al. | 260/880 |
| 4,039,491 A | 8/1977 | Ikeda et al. | 260/875 |
| 4,134,895 A | 1/1979 | Roth et al. | 260/326 |
| 4,134,927 A | 1/1979 | Tomoshige et al. | 260/878 |
| 4,417,999 A * | 11/1983 | Duffy | 252/500 |
| 4,452,942 A | 6/1984 | Shida et al. | 525/74 |
| 4,476,184 A | 10/1984 | Lubowitz et al. | 428/288 |
| 4,503,219 A | 3/1985 | Reffert et al. | 528/481 |
| 4,704,421 A | 11/1987 | Teskin et al. | 524/287 |
| 4,739,017 A | 4/1988 | Tabor et al. | 525/300 |
| 4,778,837 A | 10/1988 | Waterman et al. | 524/89 |
| 4,801,637 A | 1/1989 | McCullough et al. | 524/287 |
| 4,829,114 A | 5/1989 | Trotoir et al. | 524/243 |
| 5,013,778 A | 5/1991 | Bath et al. | 524/173 |
| 5,135,975 A | 8/1992 | Rekers et al. | 524/108 |
| 5,342,868 A | 8/1994 | Kimura et al. | 524/108 |
| 5,491,187 A | 2/1996 | Ward et al. | 524/159 |
| 5,922,793 A | 7/1999 | Amos et al. | 524/159 |
| 5,929,146 A | 7/1999 | Amos et al. | 524/89 |
| 5,981,636 A * | 11/1999 | Amos et al. | 524/108 |
| 6,096,811 A | 8/2000 | Amos et al. | 524/89 |
| 6,465,551 B1 * | 10/2002 | Zhao et al. | 524/284 |
| 6,559,211 B2 * | 5/2003 | Zhao et al. | 524/285 |
| 6,759,124 B2 * | 7/2004 | Royer et al. | 428/372 |
| 2003/0236332 A1 * | 12/2003 | Dotson et al. | 524/285 |

FOREIGN PATENT DOCUMENTS

| | | | |
|---|---|---|---|
| DE | 1 544 851 | 5/1970 | C08F/29/02 |
| DE | 1 694 914 B | 3/1972 | C08F/29/02 |
| EP | 0267 695 | 5/1988 | C08K/5/00 |
| EP | 0336 573 | 3/1989 | C08K/5/00 |
| FR | 2 075 549 | 9/1971 | C08F/45/00 |
| FR | 2 656 620 | 7/1991 | C08L/23/02 |

(Continued)

OTHER PUBLICATIONS

H.N. Beck, "Heterogeneous Nucleating Agents of Polypropylene Crystallization", Journal of Applied Polymer Science, vol. 11, pp. 673–685, 1967.

Overman et al., "An Annual Publication of Satisfactory Methods for the Preparation of Organic Chemicals." Organic Synthesis, vol. 71, pp. 48–55, 1993.

(Continued)

Primary Examiner—David W. Wu
Assistant Examiner—Rip A. Lee
(74) Attorney, Agent, or Firm—Terry T. Moyer; John E. Vick, Jr.

(57) ABSTRACT

Milled, small particle size, solid bicyclo[2.2.1]heptane dicarboxylate salt-containing thermoplastic nucleating additive formulations further comprising at least one anticaking agent for improved haze reduction, improved nucleation performance, and prevention of potential cementation (via agglomeration) of the salt component present therein are provided. Such small particle size dicarboxylate salts provide desirable properties within thermoplastic articles, particularly as nucleating agents, but apparently suffer from certain clarity issues and agglomeration problems (due to the flat and thin plate structures of such compounds and the propensity they exhibit to cohere to each other during storage), making utilization thereof less desirable for certain applications. Thus, an improvement has been provided to permit full benefit of the excellent crystallization temperatures, stiffness, and calcium stearate compatibility such dicarboxylate salts accord within target low haze thermoplastics. Furthermore, unexpected improvements in dusting reduction have been found upon the utilization of such anticaking additives in combination with the aforementioned nucleating salts. Thermoplastic additive compositions and methods of producing thermoplastics with such nucleator/anticaking additive combinations are also contemplated within this invention.

12 Claims, No Drawings

FOREIGN PATENT DOCUMENTS

| | | | |
|---|---|---|---|
| GB | 2 290 296 | 12/1995 | ......... C08K/5/3412 |
| JP | 53-40760 | 4/1978 | ................. 548/435 |
| JP | 57-18682 | 1/1982 | ......... C07D/493/04 |
| JP | 58-160343 | 9/1983 | ........... C08L/67/20 |
| JP | 60-13837 | 1/1985 | ......... C07D/493/04 |
| JP | 61-17834 | 5/1986 | |
| JP | 01-180514 | 7/1989 | ............ G02C/7/02 |
| JP | 03-076815 A | 4/1991 | ............. D01F/8/06 |
| JP | 05-139460 | 6/1993 | ............ B65D/77/00 |
| JP | 07-173342 | 7/1995 | ........... C08L/23/10 |
| WO | WO 98/29494 A1 * | 7/1998 | ........... C08K/5/098 |
| WO | WO 02/077092 A1 * | 10/2002 | ............ C08K/5/09 |
| WO | WO 02/094759 A1 * | 11/2002 | ........... C07C/61/12 |

OTHER PUBLICATIONS

Fillon et al., "Self–Nucleation and Recrystallization of Isotactic Polypropylene (alpha Phase) Investigated by Differential Scanning Calorimetry," Journal of Polymer Science: Part B: Polymer Physics, vol. 31, pp. 1383–1393, 1993.

Fillon et al., "Self–Nucleation and Enhanced Nucleation of Polymers. Definition of a Convenient Calorimetric "Efficiency Scale" and Evaluation of Nucleating Additives in Isotactic polypropylene (alpha phase)," Journal of Polymer Science: Part B: Polymer Physics, vol. 31 pp. 1395–1504, 1993.

* cited by examiner

NUCLEATING ADDITIVE FORMULATIONS OF BICYCLO[2.2.1]HEPTANE DICARBOXYLATE SALTS

FIELD OF THE INVENTION

This invention relates to milled, small particle size, solid bicyclo[2.2.1] heptane dicarboxylate salt-containing thermoplastic nucleating additive formulations further comprising at least one anticaking agent for improved haze reduction, improved nucleation performance, and prevention of potential cementation (via agglomeration) of the salt component present therein. Such small particle size dicarboxylate salts provide desirable properties within thermoplastic articles, particularly as nucleating agents, but apparently suffer from certain clarity issues and agglomeration problems (due to the flat and thin plate structures of such compounds and the propensity they exhibit to cohere to each other during storage), making utilization thereof less desirable for certain applications. Thus, an improvement has been provided to permit full benefit of the excellent crystallization temperatures, stiffness, and calcium stearate compatibility such dicarboxylate salts accord within target low haze thermoplastics. Furthermore, unexpected improvements in dusting reduction have been found upon the utilization of such anticaking additives in combination with the aforementioned nucleating salts. Thermoplastic additive compositions and methods of producing thermoplastics with such nucleator/anticaking additive combinations are also contemplated within this invention.

BACKGROUND OF THE PRIOR ART

All U.S. patents cited below are herein entirely incorporated by reference.

As used herein, the term "thermoplastic" is intended to mean a polymeric material that will melt upon exposure to sufficient heat but will retain its solidified state, but not prior shape without use of a mold or like article, upon sufficient cooling. Specifically, as well, such a term is intended solely to encompass polymers meeting such a broad definition that also exhibit either crystalline or semi-crystalline morphology upon cooling after melt-formation through the use of the aforementioned mold or like article. Particular types of polymers contemplated within such a definition include, without limitation, polyolefins (such as polyethylene, polypropylene, polybutylene, and any combination thereof), polyamides (such as nylon), polyurethanes, polyester (such as polyethylene terephthalate), and the like (as well as any combinations thereof).

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, uniformity in arrangement of crystals upon crystallization is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than un-nucleated polyolefin. Such crystallization at higher temperatures results in reduced fabrication cycle times and a variety of improvements in physical properties, such as, as one example, stiffness.

Such compounds and compositions that provide faster and or higher polymer crystallization temperatures are thus popularly known as nucleators. Such compounds are, as their name suggests, utilized to provide nucleation sites for crystal growth during cooling of a thermoplastic molten formulation. Generally, the presence of such nucleation sites results in a larger number of smaller crystals. As a result of the smaller crystals formed therein, clarification of the target thermoplastic may also be achieved, although excellent clarity is not always a result. The smaller crystal size, the less light is scattered. In such a manner, the clarity of the thermoplastic article itself can be improved. Thus, thermoplastic nucleator compounds are very important to the thermoplastic industry in order to provide enhanced clarity, physical properties and/or faster processing.

The most effective thermoplastic nucleator in terms of high crystallization temperatures is available from Milliken & Company under the tradename of HPN-68. Other like thermoplastic nucleating compounds are disclosed within U.S. Pat. Nos. 6,465,551 and 6,534,574, both entirely incorporated herein by reference. The HPN-68 compound is disodium bicyclo[2.2.1]heptanedicarboxylate. Other thermoplastic nucleating agents that exhibit appreciably lower crystallization temperatures include dibenzylidene sorbitol compounds, such as 1,3-O-2,4-bis(3,4-dimethylbenzylidene) sorbitol (hereinafter DMDBS), available from Milliken & Company under the trade name Millad® 3988, sodium benzoate, sodium 2,2'-methylene-bis-(4,6-di-tert-butylphenyl) phosphate (from Asahi Denka Kogyo K. K., known as NA-11), talc, cyclic bis-phenol phosphates (such as NA-21, also available from Asahi Denka), and, as taught within Patent Cooperation Treaty Application WO 98/29494, to Minnesota Mining and Manufacturing, the unsaturated compound of disodium bicyclo[2.2.1]heptene dicarboxylate. Such compounds all impart relatively high polyolefin crystallization temperatures; however, each also exhibits its own drawback for large-scale industrial applications, and none can match the effectiveness of the above-noted saturated types.

Some of the above-noted nucleating agents also provide clarifying properties within certain thermoplastics, such as polypropylene (Millad® 3988, for example, and to a lesser extent, NA-21). Such clarification capabilities coupled with high peak crystallization temperatures are highly desired. For certain end-uses, at least a maximum level of haze (for instance, 35%) is acceptable. The previously listed dicarboxylate salt nucleating agents unfortunately exhibit relatively high haze levels within polypropylene, although such compounds also provide excellent calcium stearate compatibility, increased stiffness within target thermoplastic articles, and certain degrees of hygroscopicity. Thus, such compounds provide extremely desirable qualities and benefits within target thermoplastics. Unfortunately, as noted above, haze problems have limited the usefulness of such nucleating agents within certain target end-uses, even though the crystallization temperatures imparted thereby are extremely high.

To remedy this initial problem, haze reduction has been achieved when such saturated dicarboxylate salts have been either spray dried to form relatively large particles, or jet-milled for substantially uniform small particle sizes (from 2.5–4.5 micrometers in length). However, it has unfortunately been noticed that upon producing such small particle size compounds, there is a tendency for the compounds to suffer from stacking and eventual agglomeration (which inevitably leads to cementation of the stored solid compounds), thus deleteriously affecting the ability to actually disperse, if not use altogether, such compounds in thermoplastic media. Additionally, during storage such compounds exhibit "growth" due to such agglomeration as well within the packaging container such that it has been noticed on regular occasions that the storage container itself becomes ruptured and/or damaged and the nucleator powders leak therefrom or it becomes very difficult to remove the cemented product therefrom. These problems are most likely due to the plate-like structures such compounds exhibit coupled with exposure to moisture and/or humidity. Unlike cubic, spherical, or other like geometric shapes, such plate-like configurations are highly susceptible to the aforementioned stacking problem. When such occurs, particularly in air jet-milled or spray dried, substantially uniform small particle-size samples, it has been realized that even a small amount of moisture can lead to molecular attraction between two plate-like structures thereof. Upon bonding, the ability to separate such structures is extremely difficult. Upon stacking of a larger number of such structures, cementation and "growth" (increase in volume within a closed space) may occur, thereby preventing use thereof of the particular sample and/or resulting in difficulties with storage within tightly sealed containers. Furthermore, it has been found in some circumstances that such cemented samples are bonded to such a degree that separation is, for the most part, impossible. Unless such small particles can actually be added and dispersed within target prepolymer media, the benefits of nucleation and possible clarification are simply unavailable. Thus, this cementation problem prevents effective utilization of such an excellent thermoplastic nucleating agent, especially for purposes of imparting lower haze levels.

As such, there is a definite need to prevent plate-to-plate interactions of individual saturated dicarboxylate salt thermoplastic nucleating agents, particularly during production, storage, and incorporation within target thermoplastic media. In such a manner, it is theorized that the substantially uniform small particle-sized compounds could then impart the desired lower haze levels than for the larger and/or nonuniform particle size compound formulations. Without such needed remedies, the ability to utilize such an extremely effective and efficacious thermoplastic nucleating agent is limited to opaque end-uses.

OBJECTS AND DETAILED DESCRIPTION OF THE INVENTION

Therefore, an object of the invention is to provide a jet-milled or spray dried, small particle-size polyolefin nucleating formulation, including saturated dicarboxylate salts, that imparts exceptional nucleation efficacy, as indicated by very high polymer peak crystallization temperatures within polyolefin articles, as well as improved clarification capabilities within polypropylene. Another objective of this invention is to provide formulations that exhibit extremely low hygroscopicity in order to accord an extremely good shelf-stable additive composition. Yet another object of this invention is to provide a saturated bicyclic nucleator compound-containing powder formulation that does not exhibit deleterious cementation (compaction) and/or growth (volume increase) during long-term storage. A further object of this invention is to provide optimum performance of the nucleating salt compound within target thermoplastics under non-ideal mixing and compounding conditions. Additionally, it is an object of this invention to provide thermoplastic nucleating compositions that may be used in various polyolefin media for use in myriad end-uses, particularly within applications that require haze measurements of mid-range levels.

Accordingly, this invention encompasses a thermoplastic additive composition comprising at least one anticaking compound or composition and at least one saturated metal or organic salts of bicyclic dicarboxylates, preferably saturated metal or organic salts of bicyclic dicarboxylates, preferably, bicyclo[2.2.1]heptane-dicarboxylates, or, generally, compounds conforming to Formula (I)

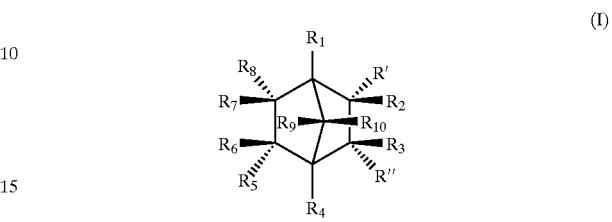

(I)

wherein $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogen, phenyl, alkylphenyl, and geminal or vicinal carbocyclic having up to nine carbon atoms, R' and R" are the same or different and are individually selected from the group consisting of hydrogen, $C_1$–$C_{30}$ alkyl, hydroxy, amine, polyamine, polyoxyamine, $C_1$–$C_{30}$ alkylamine, phenyl, halogen, $C_1$–$C_{30}$ alkoxy, $C_1$–$C_{30}$ polyoxyalkyl, C(O)—$NR_{11}$C(O)O—R''', and C(O)O—R''', wherein $R_{11}$ is selected from the group consisting of $C_1$–$C_{30}$ alkyl, hydrogen, $C_1$–$C_{30}$ alkoxy, and $C_1$–$C_{30}$ polyoxyalkyl, and wherein R''' is selected from the group consisting of hydrogen, a metal ion (such as, without limitation, $Na^+$, $K^+$, $Li^+$, $Ag^+$ and any other monovalent ions), an organic cation (such as ammonium as one non-limiting example), polyoxy-$C_2$–$C_{18}$-alkylene, $C_1$–$C_{30}$ alkyl, $C_1$–$C_{30}$ alkylene, $C_1$–$C_{30}$ alkyleneoxy, a steroid moiety (for example, cholesterol), phenyl, polyphenyl, $C_1$–$C_{30}$ alkylhalide, and $C_1$–$C_{30}$ alkylamine; wherein at least one of R' and R" is either C(O)—$NR_{11}$C(O)O—R''' or C(O)O—R''', wherein if both R' and R" are C(O)O—R''' then R''' both R' and R" may be combined into a single bivalent metal ion (such as $Ca^{2+}$, as one non-limiting example) or a single trivalent metal overbase (such as Al—OH, for one non-limiting example). Preferably, R' and R" are the same and R''' is either $Na^+$ or combined together for both R' and R" and $Ca^{2+}$. Other possible compounds are discussed in the preferred embodiment section below.

Preferably, as noted above, such a compound conforms to the structure of Formula (II)

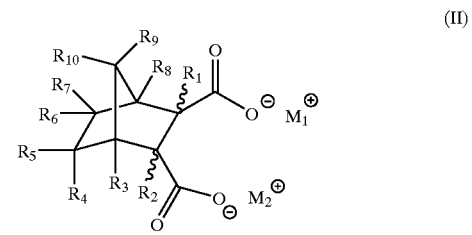

(II)

wherein $M_1$ and $M_2$ are the same or different and are independently selected from the group consisting of metal or organic cations or the two metal ions are unified into a single metal ion (bivalent, for instance, such as calcium, for example), and $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogen, phenyl, alkylphenyl, and geminal or vicinal carbocyclic having up to 9 carbon atoms. Preferably, the metal cations are selected from the group consisting of calcium, strontium, barium, magnesium, aluminum, silver, sodium, lithium, rubidium, potassium, and the like. Within that scope, group I and group II metal ions are generally preferred. Among the group I and II cations, sodium, potassium, calcium and strontium are preferred, wherein sodium and calcium are most preferred. Furthermore, the $M_1$ and $M_2$ groups may also be combined to form a single metal cation (such as calcium, strontium, barium, magnesium, aluminum, including monobasic aluminum, and the like). Although this invention encompasses all stereochemical configurations of such compounds, the cis configuration is preferred wherein cis-endo is the most preferred embodiment. The preferred embodiment polyolefin articles and additive compositions for polyolefin formulations comprising at least one of such compounds, broadly stated as saturated bicyclic carboxylate salts, are also encompassed within this invention.

As noted above, in order to develop a proper polyolefin nucleator compound or composition for industrial applications, a number of important criteria needed to be met. The inventive nucleating agents meet all of these important requirements very well. For instance, as discussed in greater detail below, these inventive salts provide excellent high peak crystallization temperatures in a variety of polyolefin formulations, particularly within random copolymer polypropylene (hereinafter RCP), impact copolymer polypropylene (hereinafter ICP), and homopolymer polypropylene (hereinafter HP). As a result, such inventive salts provide excellent mechanical properties for polyolefin articles without the need for extra fillers and rigidifying additives, and desirable processing characteristics such as improved (shorter) cycle time. The salts also do not interact deleteriously with calcium stearate additives.

The mere inclusion of an anticaking compound within a formulation of such a bicyclic nucleator compound is sufficient and considered inventive to prevent deleterious cementation and growth results during storage. In such a situation, the particle sizes of such nucleators may be of any range. However, in terms of improving haze and peak crystallization temperature properties within thermoplastics in which such a nucleator is added, the presence of an anticaking agent is helpful, but primarily when the nucleator compound exhibits a relatively small particle size. As noted below, the introduction of nucleator compounds either i) that exhibit mean particle sizes of a D95 (defined below) of at most about 10 microns and/or a MVD (also defined below) of at most 7.5, or ii) that have been high intensity-mixed and blended with either the anticaking agent simultaneously or within the target resin with the anticaking agent present. In either case, it is believed, without intending on limiting the invention, or being bound by any specific scientific principles or theories, that the nucleator compounds are reduced in particle size to such an extent as to improve the dispersion thereof within the target resin. The anticaking agent appears to prevent agglomeration during storage as well as during mixing, blending, and resin production to provide more reliable dispersion of non-agglomerating nucleator compounds as a result as well. Thus, no specific particle size range is required of the nucleator compounds during production of thermoplastics therewith, only the option of such a range or the equivalent of any high intensity-mixing step to, in essence, grind the nucleator compounds to smaller particle sizes prior to incorporation within molten resins simultaneously with the necessarily present anticaking agent (s). Thus, for purposes of this invention, the term "small particle size nucleator compound" is intended to indicate either a maximum particle size as noted above or high intensity-mixing (or equivalent) thereof.

As noted above, the target formulations for introduction of such novel nucleating agents are thermoplastics, or more specifically, polyolefins. Such formulations may be utilized in myriad different end-uses, including without limitation, such broadly considered groups as fibers, thin film or thin-walled articles (e.g., pliable wrappers, thin-walled drinking cups, etc., having thicknesses between 0.1 and 15 mils, for example), thicker plaque or other like solid articles (e.g., from 15 to 150 mils in thickness), and even thicker-walled articles (e.g., greater than 150 mils thickness). Individual types of each group include, again, without limitation, either as complete articles, or as components of articles, the following:

a) fibers: spun and nonwoven polyolefin, polyamide, polyaramid, and the like, fibers of any denier measurement, as well as blends with other synthetic or natural fibers (e.g., cotton, ramie, wool, and the like); b) thin film articles: cast films, candy wrappers, package wrappers (e.g., cigarette box wrappers, for example), and other like blown, extruded, or other similar type of film application, as well as thin-walled articles, such as drinking cups, thin containers, coverings, and the like; c) thicker plaque or other like solid articles: deli containers, water cups, cooler linings, syringes, labware, medical equipment, pipes, tubes, urinalysis cups, intravenous bags, food storage containers, waste containers, cooler housings, automotive instrument panels, flower pots, planters, office storage articles, desk storage articles, disposable packaging (e.g., reheatable food containers, either thermoformed or thin-walled or high speed injection molded types), and the like; and d) even thicker-walled articles: i) automotive applications, such as door panels, instrument panels, body panels, fan covers, steering wheels, bumper fascia, fan shields, radiator shields, automotive fluid containers, battery cases, storage compartments, and the like; ii) large appliances, such as refrigerator linings, refrigerator parts (e.g., shelves, ice machine housings, door handles, and the like), dishwasher linings, dishwasher parts (e.g., racks, pipes, tubes, door handles, liquid and/or solid detergent storage compartments), washing machine drums, washing machine agitators, and the like; iii) small appliances, such as blender housings, blender containers, toaster oven housings, toaster oven handles, coffee pots, coffee pot housings, coffee pot handles, food processors, hair dryers, can openers, and the like; iv) housewares, such as large storage totes, large storage containers, lids for either such totes or containers, waste baskets, laundry baskets, shelves, coolers, and the like; v) consumer products, such as furniture (e.g., small chairs, tables, and the like), toys, sporting goods, disposable packaging (e.g., reheatable food containers), compact disc cases, DVD cases, CD-ROM cases, floppy disc containers, floppy disc housings, VHS tape cases, VHS tape housings, flower pots, planters, clothes hangers, lawn accessories (e.g., lawn tools, and the like), garden accessories (e.g., garden implements), lawn mower housings, fuel containers, pipes, tubes, hoses, tool boxes, tackle boxes, luggage, conduits, lawn trimmer housings, large trash cans, infant car seats, infant chairs (e.g., for dining tables), and the like.

The term polyolefin or polyolefin resin is intended to encompass any materials comprised of at least one polyolefin compound. Preferred examples include isotactic and syndiotactic polypropylene, polyethylene, poly(4-methyl) pentene, polybutylene, and any blends or copolymers thereof, whether high or low density in composition. The polyolefin polymers of the present invention may include aliphatic polyolefins and copolymers made from at least one aliphatic olefin and one or more ethylenically unsaturated co-monomers. Generally, the co-monomers, if present, will be provided in a minor amount, e.g., about 10 percent or less or even about 5 percent or less, based upon the weight of the polyolefin (e.g. random copolymer polypropylene), but copolymers containing up to 25% or more of the co-monomer (e.g., impact copolymers) are also envisaged. Other polymers or rubber (such as EPDM or EPR) may also be compounded with the polyolefin to obtain the aforementioned characteristics. Such co-monomers may serve to assist in clarity improvement of the polyolefin, or they may function to improve other properties of the polymer. Other examples include acrylic acid and vinyl acetate, and the like. Examples of olefin polymers whose transparency can be improved conveniently according to the present invention are polymers and copolymers of aliphatic monoolefins containing 2 to about 6 carbon atoms which have an average molecular weight of from about 10,000 to about 2,000,000, preferably from about 30,000 to about 300,000, such as, without limitation, polyethylene, linear low density polyethylene, isotactic polypropylene, syndiotactic polypropylene, crystalline ethylenepropylene copolymer, poly(1-butene), polymethylpentene, 1-hexene, 1-octene, and vinyl cyclohexane. The polyolefins of the present invention may be described as basically linear, regular polymers that may optionally contain side chains such as are found, for instance, in conventional low density polyethylene.

Although polyolefins are preferred, the nucleating agents of the present invention are not restricted to polyolefins, and may also give beneficial nucleation properties to polyesters such as polyethylene terephthalate (PET), polybutylene terephthalate (PBT), and polyethylene naphthalate (PEN), as well as polyamides such as Nylon 6, Nylon 6,6, and others. Generally, any thermoplastic composition having some crystalline content may be improved with the nucleating agents of the present invention.

The compositions of the present invention may be obtained by adding the aforementioned anticaking additive plus saturated bicyclic dicarboxylic salt (or combination of salts or composition comprising such salts) formulation to the thermoplastic polymer or copolymer and merely mixing the resultant composition by any suitable means. Generally, commercial production methods utilize low-intensity mixing procedures for both blending additives together, as well as polymer components and additives. On some occasions, high-intensity is employed, and may be desirable, for these purposes. For the purposes of this invention, examples utilizing both types of mixing procedures for the additive and/or polymer plus additives blending methods were produced and tested.

Alternatively, a concentrate containing as much as about 20 percent by weight of the potentially preferred saturated [2.2.1] salt in a polyolefin masterbatch comprising the required acid scavenger may be prepared and be subsequently mixed with the target resin. Furthermore, the inventive compositions (with other additives potentially) may be present in any type of standard thermoplastic (e.g., polyolefin, most preferably) additive form, including, without limitation, powder, prill, agglomerate, liquid suspension, and the like, particularly comprising dispersion aids such as polyolefin (e.g., polyethylene) waxes, stearate esters of glycerin, montan waxes, mineral oil, and the like. Basically, any form may be exhibited by such a combination or composition including such combination made from blending, agglomeration, compaction, and/or extrusion.

Another alternative method of utilizing such a combination of components involves the initial addition of from 0.1 to 5% by weight of the anticaking agent to the bicyclic nucleator formulation. It has been found that for storage purposes, this low amount of anticaking additive provides the desired effect of preventing agglomeration and ultimate cementation. Subsequently, then, a larger amount of anticaking agent in the range of from 10–20% by weight, for instance, may be added to a bicyclic nucleator formulation during introduction within a target molten thermoplastic. As noted above, the high amount of anticaking agent appears to contribute to the ability of the bicyclic nucleator to impart higher crystallization temperatures and simultaneous lower haze measurements to such target thermoplastics. Thus, instead of relying upon inclusion of large amounts of anticaking agents during initial bicyclic nucleator storage, it is thus possible to delay addition of such large amounts, thereby permitting an optimization of greater amounts of the nucleator compound to be stored at the highest available level of anticaking (anti-agglomeration, anticementation, etc.), without needing to include larger amounts of such agents that would not contribute any further reductions in cementation propensities during storage.

The target thermoplastic composition may then be processed and fabricated by any number of different techniques, including, without limitation, injection molding, injection blow molding, injection stretch blow molding, injection rotational molding, extrusion, extrusion blow molding, sheet extrusion, film extrusion, cast film extrusion, foam extrusion, thermoforming (such as into films, blown-films, biaxially oriented films), thin wall injection molding, and the like, into a fabricated article.

The term anticaking agent is intended to encompass compounds and compositions that impart effective prevention of stacking and agglomeration within powders of the bicyclic nucleators defined in FIGS. (I) and (II), above, such that compaction and growth of stored powders of such type are minimal at worst, and nonexistent preferably. Thus, compaction properties such that a metal rod can be depressed though to the bottom of a glass vial (the protocol described in greater detail below) and an increase in volume of a sample powder of at most 5% of the initial measurement within the "long-term elevated temperature and humidity storage test" (again, outlined in greater detail below), preferably exhibiting no volume increase at all, properly defines the compounds intended to be within the scope of the term "anticaking agent" for purposes of this invention. In the presence of such agents, the preferred saturated dicarboxylate salt nucleator compounds are prevented from interacting and cohering together due to the ability for such agents to easily arrange themselves between plates of such salt compounds. Thereby, cementation is prevented, and volume expansion (growth) is reduced (since propensity of interaction of like charged compounds is diminished as well). The presence of such a component appears to facilitate clarification to the resultant thermoplastic (preferably, polypropylene) with simultaneous higher crystallization temperatures. Such a result is highly unexpected, although extremely useful. Particular anticaking agents useful include silica gels and treated silica gels (such as the silica gels available from W. R. Grace Company under the tradename SYLOBLOC®), talc, dihydrotalcites (DHT-4A, for example, from Mitsui Chemicals), calcium stearate, and any other type of compound or composition that effectively prevents plate-to-plate interactions between the aforementioned nucleator compounds (bicyclic dicarboxylate salts), particularly those compounds and/or compositions that also exhibit an electrical charge opposite that of the nucleating salt itself (thereby permitting reduced propensity for dusting and/or growth). Other examples may be found within U.S. Pat. Nos. 5,728,742 and 4,734,478; such references fail to teach the combination of nucleators with such agents, only the presence of such compounds within water-soluble polymers themselves to prevent caking of such materials.

Air-jet milling of the bicyclic nucleator together with the anticaking agent has surprisingly been found to impart the aforementioned lower haze/increased peak crystallization temperature for target thermoplastic articles. There has been no discussion of any such procedure being followed within polymeric articles, let alone thermoplastics. The particle size of the final air-jet milled product (made from a mix of powders of the two components that are air-jet milled simultaneously) is thus of relative importance to impart the best overall haze and peak crystallization temperatures within such thermoplastics. However, it is important to note that the mere mixing of anticaking agents with the particular bicyclic nucleators disclosed herein is sufficient to prevent the problematic cementation issues by themselves, without the need for air-jet milling. Thus, although air-jet milling is considered a preferred embodiment for this invention, there is no intention to require such a step is absolutely necessary for full practice and success with this nucleator technology.

A further surprising result accorded the particular nucleator technology disclosed herein is that when the anticaking agent is air-jet milled with such a nucleator compound, a dramatic low-dusting result is accorded. It is generally accepted with the powdered compounds art (of any kind), not to mention, specifically, within the powdered thermoplastic nucleator art, that air-jet milling to low particle sizes more likely than not will result in dusting problems. Such a result is noticeable, as one example, when a storage container is opened initially; dust materials will float from the container itself, thereby dusting the area, with the possibility of contaminating machinery, people, clothing, etc. The air-jet milled bicyclic nucleator/anticaking agent combination does not exhibit an appreciable level of dusting, to the contrary. Without intending to be bound to any specific scientific theory, it is believed that the electrical charge on the anticaking agent basically neutralizes the opposite charge present on the bicyclic nucleator compounds during storage. As like charges repel, without such neutralization the bicyclic nucleator compounds will most likely repel one another causing dusting problems as a result. The anticaking agent thus through charge neutralization, even in very low amounts, may prevent nucleator repulsion, thereby reducing the production of dust after storage. In any event, such a result is, again, highly surprising for small particle size air-jet milled powders.

Air jet-milled compounds are preferred for this invention due to low dusting during storage, better apparent dispersion within target molten thermoplastics, and thus overall the ability of such small, substantially uniform particle size nucleator formulations (nucleator plus anticaking agent, at least) to provide increased peak crystallization temperatures and decreased haze measurements in target thermoplastic articles, as well as reduced propensities for cementation and growth during storage.

PREFERRED EMBODIMENTS OF THE INVENTION

This invention can be further elucidated through the following examples where examples of particularly preferred embodiment within the scope of the present invention are presented.

Production of Nucleating Salt

To a solution of disodium bicyclo[2.2.1]hept-5-ene-2,3-dicarboxylate (30.0 g) in water (70 g) was added 0.5 g palladium on activated carbon (5 wt %). The mixture was transferred into a Parr reactor and was subjected to hydrogenation (50 psi, room temperature) for 8 hours. The activated carbon was filtered out, and the resultant solution was spray dried to give a white powder (m.p>300° C.). Spray drying was accomplished via a spray dryer using a rotary atomizer having an atomizer speed set at 9600 rpm with the inlet temperature set at 400° F. (~204–205° C.), and the outlet temperature kept between 220–225° F. (~104–108° C.). NMR and IR analyses were consistent with that of the expected structure of disodium bicyclo[2.2.1]heptane-2,3-dicarboxylate (hereinafter referred to as HPN-68, whether in spray dried or other form).

Initial Particle Size Distribution, Nucleation, Clarification, Compaction, and Growth Tests The spray dried HPN-68 nucleator powders were initially analyzed for particle size distribution measurements. Such were taken by employing the following method:

Laser Light Scattering Particle Size Measurement

For the purposes of the herein described invention, particle size measurements of all nucleator powders (whether spray dried or air jet-milled, or including an anticaking agent therein) were conducted using a MICROTRAC® X100 laser light scattering instrument. The size was calculated from a diffraction pattern that developed because of laser light interacting with the particles. The angles at which the light was scattered in combination with the intensities of the scattered light were measured by a light-sensitive detector system. The electrical values developed by the detector system were used to calculate the volume of particles as a function of particle size. The distribution provided the opportunity to calculate many parameters such as the mean volume diameter or D4,3 value also known as the MVD (a weighted arithmetic mean for the particle diameter weighted by volume of the sample) and the $95^{th}$ percentile or the D95 value (the maximum size of 95% of all the particles within the tested sample)(wherein diameter is the equivalent spherical diameter of all such samples, knowing that perfect spherical configurations and thus measurements are most likely unavailable for such measurements). It also allowed calculation of percentiles in order to divide the distribution into specific percentage amounts. These values were used to specify product particle size characteristics.

The procedure involved transfer of a representative sample of the nucleator powder directly to the instrument fluid recirculation system containing a fluid that would not dissolve the powder. In this case, an organic chemical, specifically, in this instance, a highly branched paraffin available from Exxon Corporation under the tradename ISOPAR® G was used to suspend the water-soluble powder. Food-grade lecithin was added to the ISOPAR® G paraffin to enhance wetting and maintain final dispersion of the powder particles. Ultrasonic energy was applied to separate the suspended particles that stuck together (agglomerated). The instrument was then activated to collect the scattered laser light and calculate the particle size distribution and various distribution features.

More specifically, powder was transferred to a solution of ISOPAR® G paraffin that included 0.07% (W/V) liquid soy bean lecithin that was already circulating within the instrument. The flow rate was optimized to provide sufficient agitation in order to suspend all particles without causing bubbles in the circulating solution. The nucleator powder was then added in an amount to achieve sufficient scattered light for measurement without causing optical effects such as multiple scattering, which can induce errors. A proper amount of powder will provide an approximate transmission value of 90% or obscuration value of 10% following ultrasonic treatment [values of transmission in this instance ranged from 0.85 to 0.95 (obscuration 0.05–0.15)]. The amount of powder added ranged from approximately 10 mg to 35 mg while the circulating system contained approximately 250 ml of ISOPAR® G/lecithin solution. The weighing dish used was washed with the circulating fluid solution to ensure quantitative transfer of the powder from the dish into the circulating solution.

Calculations were performed on the scattered light signals that were measured by a silicon light sensitive detector system. To correct for light scattering optical effects that occur as a property of the material in relation to the suspending fluid, Mie scattering calculations or modifications were used. These calculations include the use of refractive index of the material and the suspending fluid. The refractive index of ISOPAR® G is documented to be 1.42. The refractive index of the powder materials was found to be 1.54 using the well-accepted Becke line light microscopic method. For the spray dried HPN-68 powders alone (without anticaking agents), the distributions were recorded as a D95 of 126.3 micrometers and a MVD of 51.1 micrometers.

Furthermore, thermoplastic compositions (plaques) were produced comprising the above-produced nucleator salt without any further treatment (e.g., spray drying, air jet-milling) and sample homopolymer polypropylene (HP) resins. One kilogram batches of target polypropylene were produced in accordance with the following table:

| HOMOPOLYMER POLYPROPYLENE COMPOSITION TABLE | |
| --- | --- |
| Component | Amount |
| Polypropylene homopolymer (Basell Profax ® 6301) | 1000 g |
| Irganox ® 1010, Primary Antioxidant (from Ciba Specialty Additives) | 500 ppm |
| Irgafos ® 168, Secondary Antioxidant (from Ciba Specialty Additives) | 1000 ppm |
| Calcium Stearate | 800 ppm |
| Nucleator | as noted |

The base HP and all additives were weighed and then blended in a low-intensity mixing procedure using a 6 liter Kemutec Ribbon Blender for 5 minutes at 110 rpm. All samples were then melt compounded on a Killion single screw extruder at a ramped temperature from about 200° to 235° C. through four heating zones. The melt temperature upon exit of the extruder die was about 245° C. The screw had a diameter of about 2.5 cm and a length/diameter ratio of 24:1 and was equipped with a 60 mesh (250 micron) screen. Plaques of target polypropylene plus nucleator were then molded on an Arburg 25 ton injection molder (with a barrel temperature set at 230° C.). The plaques had dimensions of about 50 mm×75 mm×1.25 mm, and the mold had a mirror finish. The mold cooling circulating water was controlled at a temperature of 25° C.

The resultant plaques were tested for peak crystallization temperatures (by Differential Scanning Calorimetry) and haze (through utilization of a hazemeter). Peak crystallization temperature is a predictor of the cooling time needed to form a solid article in a molding process. The higher the peak crystallization temperature, the less cooling time is required to form the desired solid part. The polymer peak crystallization temperature ($T_c$), was measured by using DSC according to ASTM D-794-85. This method involved heating the specific polypropylene composition from 60° C. to 220° C. at a rate of 20° C. per minute to produce a molten formulation and held at the peak temperature for 2 minutes (for complete melting thereof). The temperature was then lowered at a rate of 20° C. per minute until it reached the starting temperature of 60° C. The crystallization temperature was thus measured as the peak maximum during the crystallization exotherm. Haze indicates the transparency of the subject article and measures the degree of sufficiently large light scattering crystals present therein via Hunter Hazemeter.

The results for the nucleator salt (hereinafter referred to as HPN-68) at different concentrations within the HP sample plaques, were as follows:

EXPERIMENTAL TABLE 1

Performance of Bicyclic Nucleators in Polypropylene Homopolymer

| Sample Nucleator (ppm) | Crystallization Temp. (° C.) | Haze (%) |
| --- | --- | --- |
| HPN-68 (Spray Dried)(500) | 122.3 | 51 |
| HPN-68 (Spray Dried)(1000) | 123.0 | 45 |
| HPN-68 (Spray Dried)(1500) | 124.0 | 43 |

The resultant powder sample was also placed in a glass vial with such that the top layer was flat within the vial. This level was indicated with a black marker. The vial was then exposed to 110° F. and 95% humidity in a Tenney Twenty Conditioning Chamber for 7 days (hereinafter the "heated high-humidity test"). The powder was subsequently observed for volume expansion (growth) and compaction (cementation). A steel spatula was used to determine if the powder was compact. If it was easy to push the spatula through the powder to the bottom of the vial, it was labeled as not compact. If a lot of force needed to be used, it was labeled as compact. If the volume within the glass vial increased more than 5% over the initial volume measurement during conditioning over the 7-day period, then growth was exhibited. The spray dried HPN-68 samples made above exhibited compaction as well as significant growth (the powder grew so much that it "domed" by forming a meniscus well above the marked black line), above 10% of the original volume.

Thus, these cementation and growth problems coupled with the high haze and potentially low peak crystallization temperatures noted previously associated with these spray dried HPN-68 samples, it was reasoned that reducing the particle sizes may contribute to better overall properties for this highly effective thermoplastic nucleator.

Initial Inventive Salt Processing

Therefore, another HPN-68 nucleator salt sample was produced, as above, collected, and either high-intensity mixed or milled on a Rotajet milling instrument, with the belief that decreasing the particle size of the nucleator compound could potentially improve the performance of such compounds in thermoplastics as well as possible improve the storage stability characteristics as well. Such a high-intensity mixing procedure involved treating (combining) the already-spray dried HPN-68 powders together with the polypropylene granules and other additives within an 8 liter Papenmeier-type mixer for 1 minute at about 1600 rpm. Air jet-milling involved utilization of a fluidized bed opposed jet grinding mill with a turbine classifier (from Fluid Energy). In such an instrument, the speed of the turbine and the air velocity can be used to control the particle size distribution produced therefrom. The resultant air jet-milled samples were tested for particle size distribution in the following manner:

In terms of cementation and growth, the same problems were present after testing within glass vials through the high-temperature humidity test as noted above for the air jet-milled samples. Growth (and the same "doming" problem for the spray dried HPN-68 samples) and cementation were exhibited by these air jet-milled samples, thereby indicating the need for a different approach to remedying such issues.

Furthermore, the particular air jet-milled powders were also tested for peak crystallization temperatures and haze within HP plaques (as above). In order to determine the efficacy of such air jet-milled samples in different commercial situations, such samples were blended with the polymer (here, HP granules) in both low- and high-intensity blending processes. Such a high-intensity mixing procedure involved blending the HP granules and nucleator compounds in an 8 liter Papenmeier-type mixer for 1 minute at about 1600 rpm (as above); low-intensity mixing followed the same procedure with the 6 liter Kemutec ribbon blender as noted previously.

The results, for both tests, as well as the particle size measurements thereof, are listed in the following table for the HPN-68 nucleator powders from above (both air jet-milled and spray dried, high-intensity mixed nucleator powders), with both high-intensity blended with HP granules prior to melt processing (High-Intensity below indicates the treatment accorded spray-dried compounds prior to any further mixing; Air Jet-Milled indicates such a step rather than initial spray-drying). Examples 1–4 were resins including air jet-milled HPN-68 nucleator compounds; Examples 5 and 6 included spray-dried nucleators, but high-intensity blended with the HP resin.

EXPERIMENTAL TABLE 2

Particle Sizes of Small Particle Size HPN-68 Nucleators and Performance Thereof in Polypropylene Homopolymer

| Samples | D95 (microns) | MVD | ppm in HP | % Haze | $T_c$ (° C.) |
|---|---|---|---|---|---|
| 1 | 94 | 16 | 1500 | 42 | 125.2 |
| 2 | 94 | 16 | 500 | 47 | 123.1 |
| 3 | 94 | 16 | 1500 | 35.4 | 125.5 |
| 4 | 94 | 16 | 500 | 39.6 | 125.1 |
| 5 | 126.3 | 51.1 | 1500 | 32.5 | 126.3 |
| 6 | 126.3 | 51.1 | 500 | 39.6 | 125.1 |

Thus, for both physical particle size reduction steps, haze and peak crystallization temperature were essentially the same, with better results for the high-intensity mixed spray-dried types. This result is most likely due to the fact that although the air jet-milled particles are smaller in size, they have a propensity to agglomerate at a relatively high rate as well, thereby increasing the overall size of the compounds requiring dispersion within the target resin. Thus, the low-intensity mixing with the resin apparently fails to properly deagglomerate the nucleator prior to polymer article formation, resulting in much higher haze results and somewhat lower crystallization temperatures. Furthermore, under the aforementioned high-temperature humidity test, it was found that similar cementation and growth results were exhibited between the spray dried types and the smaller air jet-milled particle samples. Therefore, it was reasoned that a different approach utilizing such small particle-sized nucleator salts were necessary to provide the best overall commercial viability of such highly desired thermoplastic nucleating agents.

Inclusion of Anticaking Agents

It was then theorized that the presence of an anticaking agent (or dispersant) after salt production and/or prior to storage may aid in preventing such agglomeration (cementation) problems. A number of types were tested including silica gel, silica gel treated with 50 wt. % of eurucamide ($C_{22}$ fatty amide) (SYLOBLOC® M250), calcium stearate, talc, DHT-4A, calcium carbonate, magnesium sulfate, sodium sulfate, and calcium sulfate, all as non-limiting types for such a purpose. The nucleator/anticaking agent formulations tested were as follows, with the amounts listed as weight % of the total combination of the formulation components:

FORMULATION TABLE

| Sample Label | HPN-68 Amount (wt %) | Anticaking Agent and Amount (wt %) |
|---|---|---|
| A | 70 | SYLOBLOC ® M250 (30) |
| B | 70 | SYLOBLOC ® 48 (30) |
| C | 70 | Calcium Stearate (30) |
| D | 70 | Talc (30) |
| E | 70 | DHT-4A (30) |
| F | 70 | SYLOBLOC ® M250 (30)* |
| G | 70 | Calcium Carbonate (30) |
| H | 70 | Magnesium Sulfate (30) |
| I | 70 | Sodium Sulfate (30) |
| J | 70 | Calcium Sulfate (30) |

These formulations were blended together through high-intensity mixing (Preblend), except for *, which was blended, then air jet-milled using the same procedure as noted above for such milling.

About 20 grams of the blends (powders) of each Sample from the previous Table were placed in separate glass vials and subjected to the high-temperature humidity test as discussed above, and evaluated (after the 7-day period) for volume expansion (growth) and cementation. The results were as follows:

EXPERIMENTAL TABLE 3

Growth and Cementation Performance of Nucleator/Anticaking Agent Formulations

| Sample | Growth (Yes or No) | Cementation (Yes or No) |
|---|---|---|
| HPN-68 (alone) | Yes | Yes |
| A | No | No |
| B | No | No |
| C | No | No |
| D | No | No |
| E | No | No |
| F | No | No |
| G | Yes | Yes |
| H | Yes | Yes |
| I | No | Yes |
| J | No | Yes |

Thus, Samples A-F provided the desired results, whereas the others surprisingly failed at least one of the tests for long-term storage stability and ultimate usefulness for the resin producer. Thus, Samples A-F proved to be the most effective additives for this purpose as stacking and agglomeration were not empirically observed.

The Sample A and F blends (of HPN-68 nucleator and SYLOBLOC® M250) from the Formulation Table, above, were then utilized for further testing, including particle size distribution, HP haze levels, and HP peak crystallization temperatures (following the same test protocols as noted above). It was surmised that particle size manipulation could be attained to the level necessary to effectuate the low haze and high peak crystallization temperature properties desired, as well as accord the needed low cementation and growth characteristics for long-term storage via three different procedures involving the inclusion of an anticaking agent with the high performing bicyclic nucleator compounds:
a) simultaneously air jet-milling the nucleator and anticaking agent together,
b) adding the anticaking agent to previously air jet-milled nucleator compounds,
c) high-intensity mixing previously spray-dried nucleator compounds with the anticaking agent and HP resin. Comparative results were likewise obtained for samples with both spray-dried and air jet-milled nucleator/anticaking formulations (low intensity-mixed with the HP granules) as well to determine if particle size was important for such desirable improvements. Different combinations of HPN-68 and SYLOBLOC® M250 samples (in terms of ratios of parts) were blended with the target resin formulations prior to melting in accordance with these different procedures. The ultimate resin formulations were compounded on a single screw extruder, then molded into plaques (as above) and tested for the noted haze and peak crystallization temperature characteristics, all as discussed above. The results were as follows [the letters a, b, and c indicate the same procedures as noted above; the label "comparative" after such a letter indicates the samples were low intensity-mixed with the target resin granules], for particle sizes (taken prior to blending with the resin granules; if high intensity-mixing was followed for blending with the target resin granules, then no particle size measurements were made), haze, and peak crystallization temperature measurements. The ratio indicates the number of parts of nucleator to number of parts of anticaking agent within such a formulation; thus, 70/30 indicates 70 parts HPN-68 to 30 parts SYLOBLOC® M250):

EXPERIMENTAL TABLE 4

Particle Sizes of Inventive and Comparative HPN-68 Nucleator/SYLOBLOC ® M250 Formulations and Performance Thereof in Polypropylene Homopolymer

| Ratio | Blend | D95 (microns) | MVD | ppm in HP | % Haze | $T_c$ (° C.) |
|---|---|---|---|---|---|---|
| 90/10 | a Comparative | 3.60 | 2.22 | 560 | 42.8 | 123.1 |
| 80/20 | a Comparative | 3.44 | 2.11 | 625 | 41.7 | 123.3 |
| 70/30 | a Comparative | 4.77 | 2.78 | 715 | 45.0 | 123.0 |
| 90/10 | a Comparative | 3.60 | 2.22 | 1670 | 35.7 | 125.2 |
| 80/20 | a Comparative | 3.44 | 2.11 | 1875 | 34.6 | 125.5 |
| 70/30 | a Comparative | 4.77 | 2.78 | 2145 | 39.5 | 125.0 |
| 90/10 | a | 3.60 | 2.22 | 1670 | 27.8 | 126.0 |
| 80/20 | a | 3.44 | 2.11 | 1875 | 24.6 | 126.6 |
| 70/30 | a | 4.77 | 2.78 | 715 | 38.0 | 125.0 |
| 70/30 | a | 4.77 | 2.78 | 2145 | 26.0 | 126.8 |
| 95/5 | b | — | — | 525 | 39.2 | 124.8 |
| 90/10 | b | — | — | 555 | 38.2 | 125.2 |
| 85/15 | b | — | — | 590 | 39.0 | 124.8 |
| 80/20 | b | — | — | 625 | 38.6 | 124.7 |
| 70/30 | b | — | — | 715 | 38.2 | 124.8 |
| 50/50 | b | — | — | 1000 | 35.2 | 125.2 |
| 95/5 | b | — | — | 1580 | 30.9 | 126.4 |
| 90/10 | b | — | — | 1665 | 31.0 | 126.4 |
| 85/15 | b | — | — | 1765 | 28.8 | 126.6 |
| 80/20 | b | — | — | 1875 | 27.8 | 126.8 |
| 70/30 | b | — | — | 2145 | 25.0 | 127.0 |
| 50/50 | b | — | — | 3000 | 27.7 | 126.9 |
| 70/30 | b Comparative | — | — | 715 | 48.6 | 122.3 |
| 70/30 | b Comparative | — | — | 2145 | 41.4 | 124.4 |
| 70/30 | c | — | — | 715 | 38.0 | 124.8 |
| 70/30 | c | — | — | 2145 | 25.0 | 127.0 |
| 70/30 | c Comparative | — | — | 715 | 49.9 | 122.0 |
| 70/30 | c Comparative | — | — | 2145 | 43.6 | 124.4 |

Surprisingly, the inventive small particle-size samples exhibited drastic increases over peak crystallization temperatures and noticeable reductions in haze levels when compared to plaques produced with the nucleator alone, whether physically treated to reduce particle size or not. Furthermore, it is evident that high-intensity mixing provides improvements over low-intensity mixing in these characteristics as well and the addition of the anticaking agent within the molten thermoplastic during manufacture unexpectedly provided similar results within the ultimate article. Thus, one embodiment of this invention basically requires the presence of small particle-size bicyclic nucleator compounds alone or in combination with co-milled or co-spray dried anticaking agents, or separately introduced anticaking agents within the thermoplastic manufacturing process in order to provide unexpectedly good improvements in physical and optical properties within ultimately produced thermoplastic articles, with the co-milled powders and high-intensity resin blending procedures providing the optimum results (particularly at 80/20 nucleator to anticaking agent ratios). Furthermore, the inventive co-milled and co-spray dried small particle size powders of the inventive nucleator/anticaking agent formulations provide unexpectedly improved physical properties within the stored powders in terms of cementation and growth (although the presence of anticaking agents alone appear to provide benefits in such an instance and thus small particle sizes are not always required).

Having described the invention in detail it is obvious that one skilled in the art will be able to make variations and modifications thereto without departing from the scope of the present invention. Accordingly, the scope of the present invention should be determined only by the claims appended hereto.

That which is claimed is:
1. An additive formulation comprising:
(a) at least one nucleating compound conforming to the structure of Formula (I)

(I)

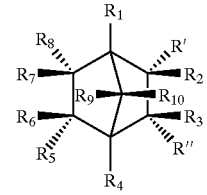

wherein $R_1$, $R_2$, $R_3$, $R_4$, $R_5$, $R_6$, $R_7$, $R_8$, $R_9$, and $R_{10}$ are independently selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogen, phenyl, alkylphenyl, and geminal or vicinal carbocyclic having up to nine carbon atoms;
wherein R' and R" are the same or different and are individually selected from the group consisting of hydrogen, $C_1$–$C_{30}$ alkyl, hydroxy, amine, polyamine, polyoxyamine, $C_1$–$C_{30}$ alkylamine, phenyl, halogen, $C_1$–$C_{30}$ alkoxy, $C_1$–$C_{30}$ polyoxyalkyl, and esters; and
wherein said nucleating compound is provided in the form of particles, said particles having a D95 size range of less than or equal to 94 micrometers at a mean volume diameter (MVD) of about 16; and
(b) an anticaking agent said, anti-caking agent comprising one or more selected from the group consisting of: silica gel; talc, dihydrotalcite; and metal carboxylates; and
wherein said anticaking agent is provided in a weight ratio of anticaking agent to nucleating compound of from about 10:90 to about 30:70.
2. The additive formulation of claim 1 wherein said metal cation is calcium.

3. The additive formulation of claim 1 wherein said metal cation comprises sodium.

4. The additive formulation of claim 1 wherein said nucleating compound comprises disodium bicyclo [2.2.1] heptane-2,3-dicarboxylate.

5. The additive formulation of claim 1 wherein said particles comprise a D95 size of less than or equal to 10 microns at a mean volume diameter (MVD) of about 7.5.

6. The additive formulation of claim 5 wherein said anticaking agent and nucleating compound are provided in a ratio of nucleating compound to anticaking agent of about 80:20.

7. A thermoplastic article comprising the additive formulation of claim 1, said article further comprising at least one polyolefin.

8. An additive formulation, wherein said additive formulation comprises in part:
   (a) an anti-caking agent and
   (b) a nucleating compound, wherein said nucleating compound conforms to the structure of:

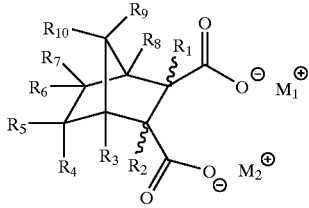

wherein $M_1$ and $M_2$ are the same or different and are independently selected from the group consisting of metal cations; and $R_1$, $R_2$, $R_3$, $R_4$, $R_5$, $R_6$, $R_7$, $R_8$, $R_9$, and $R_{10}$ are independently selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogen, phenyl, alkylphenyl, and $C_1$–$C_9$ carbocyclic wherein said metal cations are selected from the group consisting of calcium, strontium, barium, magnesium, aluminum, silver, sodium, lithium, rubidium, and potassium.

wherein said nucleating compound is provided in the form of particles, said particles having a D95 size range of less than or equal to 94 micrometers at a mean volume diameter (MVD) of about 16; and wherein said anti-caking agent comprises one or more selected from the group consisting of: silica gel; talc, dihydrotalcite; and metal carboxylate; and wherein said anticaking agent is provided in a weight ratio of anticaking agent to nucleating compound of from about 10:90 to about 30:70.

9. The additive formulation of claim 8 wherein said anticaking agent comprises a silica gel.

10. The additive formulation of claim 9 wherein said nucleating compound comprises disodium bicyclo [2.2.1] heptane-2,3-dicarboxylate.

11. The additive formulation of claim 8 wherein said nucleating compound and anticaking agent are provided in a ratio of nucleating compound to anticaking agent of about 80:20.

12. A thermoplastic article comprising the additive formulation of claim 8, said article further comprising and at least one polyolefin.

* * * * *

UNITED STATES PATENT AND TRADEMARK OFFICE
CERTIFICATE OF CORRECTION

PATENT NO. : 6,936,650 B2  Page 1 of 10
APPLICATION NO. : 10/679217
DATED : August 30, 2005
INVENTOR(S) : Mannion et al.

It is certified that error appears in the above-identified patent and that said Letters Patent is hereby corrected as shown below:

Please delete column 1 line 1 through column 18 line 31 and insert column 1 line 1 through column 18 line 33 as attached Signed and Sealed this Sixth Day of May, 2008

JON W. DUDAS
*Director of the United States Patent and Trademark Office*

NUCLEATING ADDITIVE FORMULATIONS OF BICYCLO[2.2.1]HEPTANE DICARBOXYLATE SALTS

FIELD OF THE INVENTION

This invention relates to milled, small particle size, solid bicyclo[2.2.1]heptane dicarboxylate salt-containing thermoplastic nucleating additive formulations further comprising at least one anticaking agent for improved haze reduction, improved nucleation performance, and prevention of potential cementation (via agglomeration) of the salt component present therein. Such small particle size dicarboxylate salts provide desirable properties within thermoplastic articles, particularly as nucleating agents, but apparently suffer from certain clarity issues and agglomeration problems (due to the flat and thin plate structures of such compounds and the propensity they exhibit to cohere to each other during storage), making utilization thereof less desirable for certain applications. Thus, an improvement has been provided to permit full benefit of the excellent crystallization temperatures, stiffness, and calcium stearate compatibility such dicarboxylate salts accord within target low haze thermoplastics. Furthermore, unexpected improvements in dusting reduction have been found upon the utilization of such anticaking additives in combination with the aforementioned nucleating salts. Thermoplastic additive compositions and methods of producing thermoplastics with such nucleator/anticaking additive combinations are also contemplated within this invention.

BACKGROUND OF THE PRIOR ART

All U.S. patents cited below are herein entirely incorporated by reference.

As used herein, the term "thermoplastic" is intended to mean a polymeric material that will melt upon exposure to sufficient heat but will retain its solidified state, but not prior shape without use of a mold or like article, upon sufficient cooling. Specifically, as well, such a term is intended solely to encompass polymers meeting such a broad definition that also exhibit either crystalline or semi-crystalline morphology upon cooling after melt-formation through the use of the aforementioned mold or like article. Particular types of polymers contemplated within such a definition include, without limitation, polyolefins (such as polyethylene, polypropylene, polybutylene, and any combination thereof), polyamides (such as nylon), polyurethanes, polyester (such as polyethylene terephthalate), and the like (as well as any combinations thereof).

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, uniformly in arrangement of crystals upon crystallization is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than un-nucleated polyolefin. Such crystallization at higher temperatures results in reduced fabrication cycle times and a variety of improvements in physical properties, such as, as one example, stiffness.

Such compounds and compositions that provide faster and or higher polymer crystallization temperatures are thus popularly known as nucleator. Such compounds are, as their name suggests, utilized to provide nucleation sites for crystal growth during cooling of a thermoplastic molten formulation. Generally, the presence of such nucleation sites results in a larger number of smaller crystals. As a result of the smaller crystals formed therein, clarification of the target thermoplastic may also be achieved, although excellent clarity is not always a result. The smaller crystal size, the less light is scattered. In such a manner, the clarity of the thermoplastic article itself can be improved. Thus, thermoplastic nucleator compounds are very important to the thermoplastic industry in order to provide enhanced clarity, physical properties and/or faster processing.

The most effective thermoplastic nucleator in terms of high crystallization temperatures is available from Milliken & Company under the tradename of HPN-68. Other like thermoplastic nucleating compounds are disclosed within U.S. Pat. Nos. 6,465,551 and 6,534,574, both entirely incorporated herein by reference. The HPN-68 compound is disodium bicyclo[2.2.1]heptanedicarboxylate. Other thermoplastic nucleating agents that exhibit appreciably lower crystallization temperatures include dibenzylidene sorbitol compounds, such as 1,3-O-2,4-bis(3,4-dimethylbenzylidene) sorbitol (hereinafter DMDBS), available from Milliken & Company under the trade name Millad® 3988, sodium benzoate, sodium 2,2'-methylene-bis-(4,6-di-tert-butylphenyl) phosphate (from Asahi Denka Kogyo K.K., known as NA-11), talc, cyclic bis-phenol phosphates (such as NA-21, also available from Asahi Denka), and, as taught within Patent Cooperation Treaty Application WO 98/29494, to Minnesota Mining and Manufacturing, the unsaturated compound of disodium bicyclo[2.2.1]heptene dicarboxylate. Such compounds all impart relatively high polyolefin crystallization temperatures; however, each also exhibits its own drawback for large-scale industrial applications, and none can match the effectiveness of the above-noted saturated types.

Some of the above-noted nucleating agents also provide clarifying properties within certain thermoplastics, such as polypropylene (Millad® 3988, for example, and to a lesser extent, NA-21). Such clarification capabilities coupled with high peak crystallization temperatures are highly desired. For certain end-uses, at least a maximum level of haze (for instance, 35%) is acceptable. The previously listed dicarboxylate salt nucleating agents unfortunately exhibit relatively high haze levels within polypropylene, although such compounds also provide excellent calcium stearate compatibility, increased stiffness within target thermoplastic articles, and certain degrees of hygroscopicity. Thus, such compounds provide extremely desirable qualities and benefits within target thermoplastics. Unfortunately, as noted above, haze problems have limited the usefulness of such nucleating agents within certain target end-uses, even though the crystallization temperatures imparted thereby are extremely high.

To remedy this initial problem, haze reduction has been achieved when such saturated dicarboxylate salts have been either spray dried to form relatively large particles, or jet-milled for substantially uniform small particles sizes (from 2.5-4.5 micrometers in length). However, it has unfortunately been noticed that upon producing such small particle size compounds, there is a tendency for the compounds to suffer from stacking and eventual agglomeration (which inevitably leads to cementation of the stored solid compounds), thus deleteriously affecting the ability to actually disperse, if not use altogether, such compounds in thermoplastic media. Additionally, during storage such compounds exhibit "growth" due to such agglomeration as well within the packaging container such that it has been noticed on regular occasions that the storage container itself becomes ruptured and/or damaged and the nucleator powders leak therefrom or it becomes very difficult to remove the cemented product therefrom. These problems are most likely due to the plate-like structures such compounds exhibit coupled with exposure to moisture and/or humidity. Unlike cubic, spherical, or other like geometric shapes, such plate-like configurations are highly susceptible to the aforementioned stacking problem. When such occurs, particularly in air jet-milled or spray dried, substantially uniform small particle-size samples, it has been realized that even a small amount of moisture can lead to molecular attraction between two plate-like structures thereof. Upon bonding, the ability to separate such structures is extremely difficult. Upon stacking of a larger number of such structures, cementation and "growth" (increase in volume within a closed space) may occur, thereby preventing use thereof of the particular sample and/or resulting in difficulties with storage within tightly sealed containers. Furthermore, it has been found in some circumstances that such cemented samples are bonded to such a degree that separation is, for the most part, impossible. Unless such small particles can actually be added and dispersed within target prepolymer media, the benefits of nucleation and possible clarification are simply unavailable. Thus, this cementation problem prevents effective utilization of such an excellent thermoplastic nucleating agent, especially for purposes of imparting lower haze levels.

As such, there is a definite need to prevent plate-to-plate interactions of individual saturated dicarboxylate salt thermoplastic nucleating agents, particularly during production, storage, and incorporation within target thermoplastic media. In such a manner, it is theorized that the substantially uniform small particle-sized compounds could then impart the desired lower haze levels than for the larger and/or nonuniform particle size compound formulations. Without such needed remedies, the ability to utilize such an extremely effective and efficacious thermoplastic nucleating agent is limited to opaque end-uses.

OBJECTS AND DETAILED DESCRIPTION OF THE INVENTION

Therefore, an object of the invention is to provide a jet-milled or spray dried, small particle-size polyolefin nucleating formulation, including saturated dicarboxylate salts, that imparts exceptional nucleation efficacy, as indicated by very high polymer peak crystallization temperatures within polyolefin articles, as well as improved clarification capabilities within polypropylene. Another objective of this invention is to provide formulations that exhibit extremely low hygroscopicity in order to accord an extremely good shelf-stable additive composition. Yet another object of this invention is to provide a saturated bicyclic nucleator compound-containing powder formulation that does not exhibit deleterious cementation (compaction) and/or growth (volume increase) during long-term storage. A further object of this invention is to provide optimum performance of the nucleating salt compound within target thermoplastics under non-ideal mixing and compounding conditions. Additionally, it is an object of this invention to provide thermoplastic nucleating compositions that may be used in various polyolefin media for use in myriad end-uses, particularly within applications that require haze measurements of mid-range levels.

Accordingly, this invention encompasses a thermoplastic additive composition comprising at least one anticaking compound or composition and at least one saturated metal or organic salts of bicyclic dicarboxylates, preferably saturated metal or organic salts of bicyclic dicarboxylates, preferably, bicyclo[2.2.1]heptane-dicarboxylates, or, generally, compounds conforming to Formula (I)

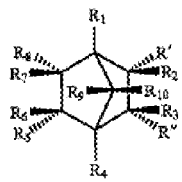

(I)

wherein $R_1$, $R_2$, $R_3$, $R_4$, $R_5$, $R_6$, $R_7$, $R_8$, $R_9$, and $R_{10}$ are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogen, phenyl, alkylphenyl, and geminal or vicinal carbocyclic having up to nine carbon atoms, R' and R" are the same or different and are individually selected from the group consisting of hydrogen, $C_1$-$C_{30}$ alkyl, hydroxy, amine, polyamine, polyoxyamine, $C_1$-$C_{30}$ alkylamine, phenyl, halogen, $C_1$-$C_{30}$ alkoxy, $C_1$-$C_{30}$ polyoxyalkyl, $C(O)$—$NR_{11}C(O)O$—R''', and $C(O)O$—R''', wherein $R_{11}$ is selected from the group consisting of $C_1$-$C_{30}$ alkyl, hydrogen, $C_1$-$C_{30}$ alkoxy, and $C_1$-$C_{30}$ polyoxyalkyl, and wherein R''' is selected from the group consisting of hydrogen, a metal ion (such as, without limitation, $Na^+$, $K^+$, $Li^+$, $Ag^+$ and any other monovalent ions), an organic cation (such as ammonium as one non-limiting example), polyoxy-$C_2$-$C_{18}$-alkylene, $C_1$-$C_{30}$ alkyl, $C_1$-$C_{30}$ alkylene, $C_1$-$C_{30}$ alkyleneoxy, a steroid moiety (for example, cholesterol), phenyl, polyphenyl, $C_1$-$C_{30}$ alkylhalide, and $C_1$-$C_{30}$ alkylamine; wherein at least one of R' and R" is either $C(O)$—$NR_{11}C(O)O$—R''' or $C(O)O$—R''', wherein if both R' and R" are $C(O)O$—R''' then R''' both R' and R" may be combined into a single bivalent metal ion (such as $Ca^{2+}$, as one non-limiting example) or a single trivalent metal overbase (such as Al—OH, for one non-limiting example). Preferably, R' and R" are the same and R''' is either $Na^+$ or combined together for both R' and R" and $Ca^{2+}$. Other possible compounds are discussed in the preferred embodiment section below.

Preferably, as noted above, such a compound conforms to the structure of Formula (II)

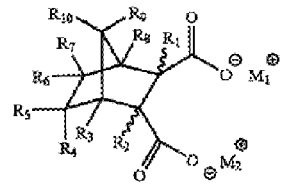

(II)

wherein $M_1$ and $M_2$ are the same or different and are independently selected from the group consisting of metal or organic cations or the two metal ions are unified into a single metal ion (bivalent, for instance, such as calcium, for example), and $R_1$, $R_2$, $R_3$, $R_4$, $R_5$, $R_6$, $R_7$, $R_8$, $R_9$, and $R_{10}$ are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogen, phenyl, alkylphenyl, and geminal or vicinal carbocyclic having up to 9 carbon atoms. Preferably, the metal cations are selected from the group consisting of calcium, strontium, barium, magnesium, aluminum, silver, sodium, lithium, rubidium, potassium, and the like. Within that scope, group I and group II metal ions are generally preferred. Among the group I and II cations, sodium, potassium, calcium and strontium are preferred, wherein sodium and calcium are most preferred. Furthermore, the $M_1$ and $M_2$ groups may also be combined to form a single metal cation (such as calcium, strontium, barium, magnesium, aluminum, including monobasic aluminum, and the like). Although this invention encompasses all stereochemical configurations of such compounds, the cis configuration is preferred wherein cis-endo is the most preferred embodiment. The preferred embodiment polyolefin articles and additive compositions for polyolefin formulations comprising at least one of such compounds, broadly stated as saturated bicyclic carboxylate salts, are also encompassed within this invention.

As noted above, in order to develop a proper polyolefin nucleator compound or composition for industrial applications, a number of important criteria needed to be met. The inventive nucleating agents meet all of these important requirements very well. For instance, as discussed in greater detail below, there inventive salts provide excellent high peak crystallization temperatures in a variety of polyolefin formulations, particularly within random copolymer polypropylene (hereinafter RCP), impact copolymer polypropylene (hereinafter ICP), and homopolymer polypropylene (hereinafter HP). As a result, such inventive salts provide excellent mechanical properties for polyolefin articles without the need for extra fillers and rigidifying additives, and desirable processing characteristics such as improved (shorter) cycle time. The salts also do not interact deleteriously with calcium stearate additives.

The mere inclusion of an anticaking compound within a formulation of such a bicyclic nucleator compound is sufficient and considered inventive to prevent deleterious cementation and growth results during storage. In such a situation, the particle sizes of such nucleators may be of any range. However, in terms of improving haze and peak crystallization temperature properties within thermoplastics in which such a nucleator is added, the presence of an anticaking agent is helpful, but primarily when the nucleator compound exhibits a relatively small particle size. As noted below, the introduction of nucleator compounds either i) that exhibit mean particle sizes of a D95 (defined below) of at most about 10 microns and/or a MVD (also defined below) of at most 7.5, or ii) that have been high intensity-mixed and blended with either the anticaking agent simultaneously or within the target resin with the anticaking agent present. In either case, it is believed, without intending on limiting the invention, or being bound by any specific scientific principles or theories, that the nucleator compounds are reduced in particular size to such an extent as to improve the dispersion thereof within the target resin. The anticaking agent appears to prevent agglomeration during storage as well as during mixing, blending, and resin production to provide more reliable dispersion of non-agglomerating nucleator compounds as a result as well. Thus, no specific particle size range is required of the nucleator compounds during production of thermoplastics therewith, only the option of such a range or the equivalent of any high intensity-mixing step to, in essence, grind the nucleator compounds to smaller particle sizes prior to incorporation within molten resins simultaneously with the necessarily present anticaking agent(s). Thus, for purposes of this invention, the term "small particle size nucleator compound" is intended to indicate either a maximum particle size as noted above or high intensity-mixing (or equivalent) thereof.

As noted above, the target formulations for introduction of such novel nucleating agents are thermoplastics, or more specifically, polyolefins. Such formulations may be utilized in myriad different end-uses, including without limitation, such broadly considered groups as fibers, thin film or thin-walled articles (e.g., pliable wrappers, thin-walled drinking cups, etc., having thicknesses between 0.1 and 15 mils, for example), thicker plaque or other like solid articles (e.g., from 15 to 150 mils in thickness), and even thicker-walled articles (e.g., greater than 150 mils thickness). Individual types of each group include, again, without limitation, either as complete articles, or as components of articles, the following:

a) fibers: spun and nonwoven polyolefin, polyamide, polyaramid, and the like, fibers of any denier measurement, as well as blends with other synthetic or natural fibers (e.g., cotton, ramie, wool, and the like); b) thin film articles: cast films, candy wrappers, package wrappers (e.g., cigarette box wrappers, for example), and other like blown, extruded, or other similar type of film application, as well as thin-walled articles, such as drinking cups, thin containers, coverings, and the like; c) thicker plaque or other like solid articles: deli containers, water cups, cooler linings, syringes, labware, medical equipment, pipes, tubes, urinanalysis cups, intravenous bags, food storage containers, waste containers, cooler housings, automotive instrument panels, flower pots, planters, office storage articles, desk storage articles, disposable packaging (e.g., reheatable food containers, either thermoformed or thin-walled or high speed injection molded types), and the like; and d) even thicker-walled articles: i) automotive applications, such as door panels, instrument panels, body panels, fan covers, steering wheels, bumper fascia, fan shields, radiator shields, automotive fluid containers, battery cases, storage compartments, and the like; ii) large appliances, such as refrigerator linings, refrigerator parts (e.g., shelves, ice machine housings, door handles, and the like), dishwasher linings, dishwasher parts (e.g., racks, pipes, tubes, door handles, liquid and/or solid detergent storage compartments), washing machine drums, washing machine agitators, and the like; iii) small appliances, such as blender housings, blender containers, toaster oven housings, toaster oven handles, coffee pots, coffee pot housings, coffee pot handles, food processors, hair dryers, can openers, and the like; iv) housewares, such as large storage totes, large storage containers, lids for either such totes or containers, waste baskets, laundry baskets, shelves, coolers, and the like; v) consumer products, such as furniture (e.g., small chairs, tables, and the like), toys, sporting goods, disposable packaging (e.g., reheatable food containers), compact disc cases, DVD cases, CD-ROM cases, floppy disc containers, floppy disc housings, VHS tape cases, VHS tape housings, flower pots, planters, clothes hangers, lawn accessories (e.g., lawn tools, and the like), garden accessories (e.g., garden implements), lawn mower housings, fuel containers, pipes, tubes, hoses, tool boxes, tackle boxes, luggage, conduits, lawn trimmer housings, large trash cans, infant car seats, infant chairs (e.g., for dining tables), and the like.

The term polyolefin or polyolefin resin is intended to encompass any materials comprised of at least one polyolefin compound. Preferred examples include isotactic and syndiotactic polypropylene, polyethylene, poly(4-methyl) pentene, polybutylene, and any blends or copolymers thereof, whether high or low density in composition. The polyolefin polymers of the present invention may include aliphatic polyolefins and copolymers made from at least one aliphatic olefin and one or more ethylenically unsaturated co-monomers. Generally, the co-monomers, if present, will be provided in a minor amount, e.g., about 10 percent or less or even about 5 percent or less, based upon the weight of the polyolefin (e.g. random copolymer polypropylene), but copolymers containing up to 25% or more of the co-monomer (e.g., impact copolymers) are also envisaged. Other polymers or rubber (such as EPDM or EPR) may also be compounded with the polyolefin to obtain the aforementioned characteristics. Such co-monomers may serve to assist in clarity improvement of the polyolefin, or they may function to improve other properties of the polymer. Other examples include acrylic acid and vinyl acetate, and the like. Examples of olefin polymers whose transparency can be improved conveniently according to the present invention are polymers and copolymers of aliphatic monoolefins containing 2 to about 6 carbon atoms which have an average molecular weight of from about 10,000 to about 2,000,000, preferably from about 30,000 to about 300,000, such as, without limitation, polyethylene, linear low density polyethylene, isotactic polypropylene, syndiotactic polypropylene, crystalline ethylenepropylene copolymer, poly(1-butene), polymethylpentene, 1-hexene, 1-octene, and vinyl cyclohexane. The polyolefins of the present invention may be described as basically linear, regular polymers that may optionally contain side chains such as are found, for instance, in conventional low density polyethylene.

Although polyolefins are preferred, the nucleating agents of the present invention are not restricted to polyolefins, and may also give beneficial nucleation properties to polyesters such as polyethylene terephthalate (PET), polybutylene terephthalate (PBT), and polyethylene naphthalate (PEN), as well as polyamides such as Nylon 6, Nylon 6,6, and others. Generally, any thermoplastic composition having some crystalline content may be improved with the nucleating agents of the present invention.

The compositions of the present invention may be obtained by adding the aforementioned anticaking additive plus saturated bicyclic dicarboxylic salt (or combination of salts or composition comprising such salts) formulation to the thermoplastic polymer or copolymer and merely mixing the resultant composition by any suitable means. Generally, commercial production methods utilize low-intensity mixing procedures for both blending additives together, as well as polymer components and additives. On some occasions, high-intensity is employed, and may be desirable, for these purposes. For the purposes of this invention, examples utilizing both types of mixing procedures for the additive and/or polymer plus additives blending methods were produced and tested.

Alternatively, a concentrate containing as much as about 20 percent by weight of the potentially preferred saturated [2.2.1] salt in a polyolefin masterbatch comprising the required acid scavenger may be prepared and be subsequently mixed with the target resin. Furthermore, the inventive compositions (with other additives potentially) may be present in any type of standard thermoplastic (e.g., polyolefin, most preferably) additive form, including, without limitation, powder, prill, agglomerate, liquid suspension, and the like, particularly comprising dispersion aids such as polyolefin (e.g., polyethylene) waxes, stearate esters of glycerin, montan waxes, mineral oil, and the like. Basically, any form may be exhibited by such a combination or composition including such combination made from blending, agglomeration, compaction, and/or extrusion.

Another alternative method of utilizing such a combustion of components involves the initial addition of from 0.1 to 5% by weight of the anticaking agent to the bicyclic nucleator formulation. It has been found that for storage purposes, this low amount of anticaking additive provides the desired effect of preventing agglomeration and ultimate cementation. Subsequently, then, a larger amount of anticaking agent in the range of from 10-20% by weight, for instance, may be added to a bicyclic nucleator formulation during introduction within a target molten thermoplastic. As noted above, the high amount of anticaking agent appears to contribute to the ability of the bicyclic nucleator to impart higher crystallization temperatures and simultaneous lower haze measurements to such target thermoplastics. Thus, instead of relying upon inclusion of large amounts of anticaking agents during initial bicyclic nucleator storage, it is thus possible to delay addition of such large amounts, thereby permitting an optimization of greater amounts of the nucleator compound to be stored at the highest available level of anticaking (anti-agglomeration, anticementation, etc.), without needing to include larger amounts of such agents that would not contribute any further reductions in cementation propensities during storage.

The target thermoplastic composition may then be processed and fabricated by any number of different techniques, including, without limitation, injection molding, injection blow molding, injection stretch blow molding, injection rotational molding, extrusion, extrusion blow molding, sheet extrusion, film extrusion, cast film extrusion, foam extrusion, thermoforming (such as into films, blown-films, biaxially oriented films), thin wall injection molding, and the like, into a fabricated article.

The term anticaking agent is intended to encompass compounds and compositions that impart effective prevention of stacking and agglomeration within powders of the bicyclic nucleators defined in Figures (I) and (II), above, such that compaction and growth of stored powders of such type are minimal at worst, and nonexistent preferably. Thus, compaction properties such that a metal rod can be depressed though to the bottom of a glass vial (the protocol described in greater detail below) and an increase in volume of a sample powder of at most 5% of the initial measurement within the "long-term elevated temperature and humidity storage test" (again, outlined in greater detail below), preferably exhibiting no volume increase at all, properly defines the compounds intended to be within the scope of the term "anticaking agent" for purposes of this invention. In the presence of such agents, the preferred saturated dicarboxylate salt nucleator compounds are prevented from interacting and cohering together due to the ability for such agents to easily arrange themselves between plates of such salt compounds. Thereby, cementation is prevented, and volume expansion (growth) is reduced (since propensity of interaction of like charged compounds is diminished as well). The presence of such a component appears to facilitate clarification to the resultant thermoplastic (preferably, polypropylene) with simultaneous higher crystallization temperatures. Such a result is highly unexpected, although extremely useful. Particular anticaking agents useful include silica gels and treated silica gels (such as the silica gels available from W.R. Grace Company under the tradename SYLOBLOC®), talc, dihydrotalcites (DHT-4A, for example, from Mitsui Chemicals), calcium stearate, and any other type of compound or composition that effectively prevents plate-to-plate interactions between the aforementioned nucleator compounds (bicyclic dicarboxylate salts), particularly those compounds and/or compositions that also exhibit an electrical charge opposite that of the nucleating salt itself (thereby permitting reduced propensity for dusting and/or growth). Other examples may be found within U.S. Pat. Nos. 5,728,742 and 4,734,478; such references fail to teach the combination of nucleators with such agents, only the presence of such compounds within water-soluble polymers themselves to prevent caking of such materials.

Air-jet milling of the bicyclic nucleator together with the anticaking agent has surprisingly been found to impart the aforementioned lower haze/increased peak crystallization temperature for target thermoplastic articles. There has been no discussion of any such procedure being followed within polymeric articles, let alone thermoplastics. The particle size of the final air-jet milled product (made from a mix of powders of the two components that are air-jet milled simultaneously) is thus of relative importance to impart the best overall haze and peak crystallization temperatures within such thermoplastics. However, it is important to note that the mere mixing of anticaking agents with the particular bicyclic nucleators disclosed herein is sufficient to prevent the problematic cementation issues by themselves, without the need for air-jet milling. Thus, although air-jet milling is considered a preferred embodiment for this invention, there is no intention to require such a step is absolutely necessary for full practice and success with this nucleator technology.

A further surprising result accorded the particular nucleator technology disclosed herein is that when the anticaking agent is air-jet milled with such a nucleator compound, a dramatic low-dusting result is accorded. It is generally accepted with the powdered compounds art (of any kind), not to mention, specifically, within the powdered thermoplastic nucleator art, that air-jet milling to low particle sizes more likely than not will result in dusting problems. Such a result is noticeable, as one example, when a storage container is opened initially; dust materials will float from the container itself, thereby dusting the area, with the possibility of contaminating machinery, people, clothing, etc. The air-jet milled bicyclic nucleator/anticaking agent combination does not exhibit an appreciable level of dusting, to the contrary. Without intending to be bound to any specific scientific theory, it is believed that the electrical charge on the anticaking agent basically neutralizes the opposite charge present on the bicyclic nucleator compounds during storage. As like charges repel, without such neutralization the bicyclic nucleator compounds will most likely repel one another causing dusting problems as a result. The anticaking agent thus through charge neutralization, even in very low amounts, may prevent nucleator repulsion, thereby reducing the production of dust after storage. In any event, such a result is, again, highly surprising for small particle size air-jet milled powders.

Air jet-milled compounds are preferred for this invention due to low dusting during storage, better apparent dispersion within target molten thermoplastics, and thus overall the ability of such small, substantially uniform particle size nucleator formulations (nucleator plus anticaking agent, at least) to provide increased peak crystallization temperatures and decreased haze measurements in target thermoplastic articles, as well as reduced propensities for cementation and growth during storage.

PREFERRED EMBODIMENTS OF THE INVENTION

This invention can be further elucidated through the following examples where examples of particularly preferred embodiment within the scope of the present invention are presented.

Production of Nucleating Salt

To a solution of disodium bicyclo[2.2.1]hept-5-ene-2,3-dicarboxylate (30.0 g) in water (70 g) was added 0.5 g palladium on activated carbon (5 wt %). The mixture was transferred into a Parr reactor and was subjected to hydrogenation (50 psi, room temperature) for 8 hours. The activated carbon was filtered out, and the resultant solution was spray dried to give a white powder (m.p>300° C.). Spray drying was accomplished via a spray dryer using a rotary atomizer having an atomizer speed set at 9600 rpm with the inlet temperature set at 400° F. (~204-205° C.), and the outlet temperature kept between 220-225° F. (~104-108° C.). NMR and IR analyses were consistent with that of the expected structure of disodium bicyclo[2.2.1]heptane-2,3-dicarboxylate (hereinafter referred to as HPN-68, whether in spray dried or other form).

Initial Particle Size Distribution, Nucleation, Clarification, Compaction, and Growth Tests The spray dried HPN-68 nucleator powders were initially analyzed for particle size distribution measurements. Such were taken by employing the following method:

Laser Light Scattering Particle Size Measurement

For the purposes of the herein described invention, particle size measurements of all nucleator powders (whether spray dried or air jet-milled, or including an anticaking agent therein) were conducted using a MICROTRAC® X100 laser light scattering instrument. The size was calculated from a diffraction pattern that developed because of laser light interacting with the particles. The angles at which the light was scattered in combination with the intensities of the scattered light were measured by a light-sensitive detector system. The electrical values developed by the detector system were used to calculate the volume of particles as a function of particle size. The distributed provided the opportunity to calculate many parameters such as the mean volume diameter or D4,3 value also known as the MVD (a weighted arithmetic mean for the particle diameter weighted by volume of the sample) and the $95^{th}$ percentile or the D95 value (the maximum size of 95% of all the particles within the tested sample) (wherein diameter is the equivalent spherical diameter of all such samples, knowing that perfect spherical configurations and thus measurements are most likely unavailable for such measurements). It also allowed calculation of percentiles in order to divide the distribution into specific percentage amounts. These values were used to specify product particle size characteristics.

The procedure involved transfer of a representative sample of the nucleator powder directly to the instrument fluid recirculation system containing a fluid that would not dissolve the powder. In this case, an organic chemical, specifically, in this instance, a highly branched paraffin available from Exxon Corporation under the tradename ISOPAR® G was used to suspend the water-soluble powder. Food-grade lecithin was added to the ISOPAR® G paraffin to enhance wetting and maintain final dispersion of the powder particles. Ultrasonic energy was applied to separate the suspended particles that stuck together (agglomerated). The instrument was then activated to collect the scattered laser light and calculate the particle size distribution and various distribution features.

More specifically, powder was transferred to a solution of ISOPAR® G paraffin that included 0.07% (W/V) liquid soy bean lecithin that was already circulating within the instrument. The flow rate was optimized to provide sufficient agitation in order to suspend all particles without causing bubbles in the circulating solution. The nucleator powder was then added in an amount to achieve sufficient scattered light for measurement without causing optical effects such as multiple scattering, which can induce errors. A proper amount of powder will provide an approximate transmission value of 90% or obscuration value of 10% following ultrasonic treatment [values of transmission in this instance ranged from 0.85 to 0.95 (obscuration 0.05-0.15)]. The amount of powder added ranged from approximately 10 mg to 35 mg while the circulating system contained approximately 250 ml of ISOPAR® G/lecithin solution. The weighing dish used was washed with the circulating fluid solution to ensure quantitative transfer of the powder from the dish into the circulating solution.

Calculations were performed on the scattered light signals that were measured by a silicon light sensitive detector system. To correct for light scattering optical effects that occur as a property of the material in relation to the suspending fluid, Mie scattering calculations or modifications were used. These calculations include the use of refractive index of the material and the suspending fluid. The refractive index of ISOPAR® G is documented to be 1.42. The refractive index of the powder materials was found to be 1.54 using the well-accepted Becke line light microscopic method. For the spray dried HPN-68 powders alone (without anticaking agents), the distributions were recorded as a D95 of 126.3 micrometers and a MVD of 51.1 micrometers.

Furthermore, thermoplastic compositions (plaques) were produced comprising the above-produced nucleator salt without any further treatment (e.g., spray drying, air jet-milling) and sample homopolymer polypropylene (HP) resins. One kilogram batches of target polypropylene were produced in accordance with the following table:

HOMOPOLYMER POLYPROPYLENE COMPOSITION TABLE

| Component | Amount |
|---|---|
| Polypropylene homopolymer (Basell Profax ® 6301) | 1000 g |
| Irganox ® 1010, Primary Antioxidant (from Ciba Specialty Additives) | 500 ppm |
| Irgafos ® 168, Secondary Antioxidant (from Ciba Specialty Additives) | 1000 ppm |
| Calcium Stearate | 800 ppm |
| Nucleator | as noted |

The base HP and all additives were weighed and then blended in a low-intensity mixing procedure using a 6 liter Kemutec Ribbon Blender for 5 minutes at 110 rpm. All samples were then melt compounded on a Killion single screw extruder at a ramped temperature from about 200° to 235° C. through four heating zones. The melt temperature upon exit of the extruder die was about 245° C. The screw had a diameter of about 2.5 cm and a length/diameter ratio of 24:1 and was equipped with a 60 mesh (250 micron) screen. Plaques of target polypropylene plus nucleator were then molded on an Arburg 25 ton injection molder (with a barrel temperature set at 230° C.). The plaques had dimensions of about 50 mm×75 mm×1.25 mm, and the mold had a mirror finish. The mold cooling circulating water was controlled at a temperature of 25° C.

The resultant plaques were tested for peak crystallization temperatures (by Differential Scanning Calorimetry) and haze (through utilization of a hazemeter). Peak crystallization temperature is a predictor of the cooling time needed to form a solid article in a molding process. The higher the peak crystallization temperature, the less cooling time is required to form the desired solid part. The polymer peak crystallization temperature ($T_c$) was measured by using DSC according to ASTM D-794-85. This method involved heating the specific polypropylene composition from 60° C. to 220° C. at a rate of 20° C. per minute to produce a molten formulation and held at the peak temperature for 2 minutes (for complete melting thereof). The temperature was then lowered at a rate of 20° C. per minute until it reached the starting temperature of 60° C. The crystallization temperature was thus measured as the peak maximum during the crystallization exotherm. Haze indicates the transparency of the subject article and measures the degree of sufficiently large light scattering crystals present therein via Hunter Hazemeter.

The results for the nucleator salt (hereinafter referred to as HPN-68) at different concentrations within the HP sample plaques, were as follows:

EXPERIMENTAL TABLE 1

Performance of Bicyclic Nucleators in Polypropylene Homopolymer

| Sample Nucleator (ppm) | Crystallization Temp. (° C.) | Haze (%) |
|---|---|---|
| HPN-68 (Spray Dried)(500) | 122.3 | 51 |
| HPN-68 (Spray Dried)(1000) | 123.0 | 45 |
| HPN-68 (Spray Dried)(1500) | 124.0 | 43 |

The resultant powder sample was also placed in a glass vial with such that the top layer was flat within the vial. This level was indicated with a black marker. The vial was then exposed to 110° F. and 95% humidity in a Tenney Twenty Conditioning Chamber for 7 days (hereinafter the "heated high-humidity test"). The powder was subsequently observed for volume expansion (growth) and compaction (cementation). A steel spatula was used to determine if the powder was compact. If it was easy to push the spatula through the powder to the bottom of the vial, it was labeled as not compact. If a lot of force needed to be used, it was labeled as compact. If the volume within the glass vial increased more than 5% over the initial volume measurement during conditioning over the 7-day period, then growth was exhibited. The spray dried HPN-68 samples made above exhibited compaction as well as significant growth (the powder grew so much that it "domed" by forming a meniscus well above the marked black line), above 10% of the original volume.

Thus, these cementation and growth problems coupled with the high haze and potentially low peak crystallization temperatures noted previously associated with these spray dried HPN-68 samples, it was reasoned that reducing the particle sizes may contribute to better overall properties for this highly effective thermoplastic nucleator.

Initial Inventive Salt Processing

Therefore, another HPN-68 nucleator salt sample was produced, as above, collected, and either high-intensity mixed or milled on a Rotajet milling instrument, with the belief that decreasing the particle size of the nucleator compound could potentially improve the performance of such compounds in thermoplastics as well as possible improve the storage stability characteristics as well. Such a high-intensity mixing procedure involved treating (combining) the already-spray dried HPN-68 powders together with the polypropylene granules and other additives within an 8 liter Papenmeier-type mixer for 1 minute at about 1600 rpm. Air jet-milling involved utilization of a fluidized bed opposed jet grinding mill with a turbine classifier (from Fluid Energy). In such an instrument, the speed of the turbine and the airvelocity can be used to control the particle size distribution produced therefrom. The resultant air jet-milled samples were tested for particle size distribution in the following manner:

In terms of cementation and growth, the same problems were present after testing within glass vials through the high-temperature humidity test as noted above for the air jet-milled samples. Growth (and the same "doming" problem for the spray dried HPN-68 samples) and cementation were exhibited by these air jet-milled samples, thereby indicating the need for a different approach to remedying such issues.

Furthermore, the particular air jet-milled powders were also tested for peak crystallization temperatures and haze within HP plaques (as above). In order to determine the efficacy of such air jet-milled samples in different commercial situations, such samples were blended with the polymer (here, HP granules) in both low- and high-intensity blending processes. Such a high-intensity mixing procedure involved blending the HP granules and nucleator compounds in an 8 liter Papenmeier-type mixer for 1 minute at about 1600 rpm (as above); low-intensity mixing followed the same procedure with the 6 liter Kemutec ribbon blender as noted previously.

The results, for both tests, as well as the particle size measurements thereof, are listed in the following table for the HPN-68 nucleator powders from above (both air jet-milled and spray dried, high-intensity mixed nucleator powders), with both high-intensity blended with HP granules prior to melt processing (High-Intensity below indicates the treatment accorded spray-dried compounds prior to any further mixing; Air Jet-Milled indicates such a step rather than initial spray-drying). Examples 1-4 were resins including air jet-milled HPN-68 nucleator compounds; Examples 5 and 6 included spray-dried nucleators, but high-intensity blended with the HP resin.

EXPERIMENTAL TABLE 2

Particle Sizes of Small Particle Size HPN-68 Nucleators and Performance Thereof in Polypropylene Homopolymer

| Samples | D95 (microns) | MVD | ppm in HP | % Haze | $T_c$ (C°) |
|---|---|---|---|---|---|
| 1 | 94 | 16 | 1500 | 42 | 125.2 |
| 2 | 94 | 16 | 500 | 47 | 123.1 |
| 3 | 94 | 16 | 1500 | 35.4 | 125.5 |
| 4 | 94 | 16 | 500 | 39.6 | 125.1 |
| 5 | 126.3 | 51.1 | 1500 | 32.5 | 126.3 |
| 6 | 126.3 | 51.1 | 500 | 39.6 | 125.1 |

Thus, for both physical particle size reduction steps, haze and peak crystallization temperature were essentially the same, with better results for the high-intensity mixed spray-dried types. This result is most likely due to the fact that although the air jet-milled particles are smaller in size, they have a propensity to agglomerate at a relatively high rate as well, thereby increasing the overall size of the compounds requiring dispersion within the target resin. Thus, the low-intensity mixing with the resin apparently fails to properly deagglomerate the nucleator prior to polymer article formation, resulting in much higher haze results and somewhat lower crystallization temperatures. Furthermore, under the aforementioned high-temperature humidity test, it was found that similar cementation and growth results were exhibited between the spray dried types and the smaller air jet-milled particle samples. Therefore, it was reasoned that a different approach utilizing such small particle-sized nucleator salts were necessary to provide the best overall commercial viability of such highly desired thermoplastic nucleating agents.

Inclusion of Anticaking Agents

It was then theorized that the presence of an anticaking agent (or dispersant) after salt production and/or prior to storage may aid in preventing such agglomeration (cementation) problems. A number of types were tested including silica gel, silica gel treated with 50 wt. % of eurucamide ($C_{22}$ fatty amide) (SYLOBLOC® M250), calcium stearate, talc, DHT-4A, calcium carbonate, magnesium sulfate, sodium sulfate, and calcium sulfate, all as non-limiting types for such a purpose. The nucleator/anticaking agent formulations tested were as follows, with the amounts listed as weight % of the total combination of the formulation components:

FORMULATION TABLE

| Sample Label | HPN-68 Amount (wt %) | Anticaking Agent and Amount (wt %) |
|---|---|---|
| A | 70 | SYLOBLOC® M250 (30) |
| B | 70 | SYLOBLOC® 48 (30) |
| C | 70 | Calcium Stearate (30) |
| D | 70 | Talc (30) |
| E | 70 | DHT-4A (30) |
| F | 70 | SYLOBLOC® M250 (30)* |
| G | 70 | Calcium Carbonate (30) |
| H | 70 | Magnesium Sulfate (30) |
| I | 70 | Sodium Sulfate (30) |
| J | 70 | Calcium Sulfate (30) |

These formulations were blended together through high-intensity mixing (Preblend), except for *, which was blended, then air jet-milled using the same procedure as noted above for such milling.

About 20 grams of the blends (powders) of each Sample from the previous Table were placed in separate glass vials and subjected to the high-temperature humidity test as discussed above, and evaluated (after the 7-day period) for volume expansion (growth) and cementation. The results were as follows:

EXPERIMENTAL TABLE 3

Growth and Cementation Performance of Nucleator/Anticaking Agent Formulations

| Sample | Growth (Yes or No) | Cementation (Yes or No) |
|---|---|---|
| HPN-68 (alone) | Yes | Yes |
| A | No | No |
| B | No | No |
| C | No | No |
| D | No | No |
| E | No | No |
| F | No | No |
| G | Yes | Yes |
| H | Yes | Yes |
| I | No | Yes |
| J | No | Yes |

Thus, Samples A-F provided the desired results, whereas the others surprisingly failed at least one of the tests for long-term storage stability and ultimate usefulness for the resin producer. Thus, Samples A-F proved to be the most effective additives for this purpose as stacking and agglomeration were not empirically observed.

The Sample A and F blends (of HPN-68 nucleator and SYLOBLOC® M250) from the Formulation Table, above, were then utilized for further testing, including particle size distribution, HP haze levels, and HP peak crystallization temperatures (following the same test protocols as noted above). It was surmised that particle size manipulation could be attained to the level necessary to effectuate the low haze and high peak crystallization temperature properties desired, as well as accord the needed low cementation and growth characteristics for long-term storage via three different procedures involving the inclusion of an anticaking agent with the high performing bicyclic nucleator compounds:
a) simultaneously air jet-milling the nucleator and anticaking agent together,
b) adding the anticaking agent to previously air jet-milled nucleator compounds,
c) high-intensity mixing previously spray-dried nucleator compounds with the anticaking agent and HP resin.

Comparative results were likewise obtained for samples with both spray-dried and air jet-milled nucleator/anticaking formulations (low intensity-mixed with the HP granules) as well to determine if particle size was important for such desirable improvements. Different combinations of HPN-68 and SYLOBLOC® M250 samples (in terms of ratios of parts) were blended with the target resin formulations prior to melting in accordance with these different procedures. The ultimate resin formulations were compounded on a single screw extruder, then molded into plaques (as above) and tested for the noted haze and peak crystallization temperature characteristics, all as discussed above. The results were as follows (the letters a, b, and c indicate the same procedures as noted above; the label "comparative" after such a letter indicates the samples were low intensity-mixed with the target resin granules), for particle sizes (taken prior to blending with the resin granules; if high intensity-mixing was followed for blending with the target resin granules, then no particle size measurements were made), haze, and peak crystallization temperature measurements. The ratio indicates the number of parts of nucleator to number of parts of anticaking agent within such a formulation; thus, 70/30 indicates 70 parts HPN-68 to 30 parts SYLOBLOC® M250):

EXPERIMENTAL TABLE 4

Particle Sizes of Inventive and Comparative HPN-68 Nucleator/SYLOBLOC ® M250 Formulations and Performance Thereof in Polypropylene Homopolymer

| Ratio Blend | D95 (microns) | MVD | ppm in HP | % Haze | $T_c$ (C°) |
|---|---|---|---|---|---|
| 90/10 a Comparative | 3.60 | 2.22 | 560 | 42.8 | 123.1 |
| 80/20 a Comparative | 3.44 | 2.11 | 625 | 41.7 | 123.3 |
| 70/30 a Comparative | 4.77 | 2.78 | 715 | 45.0 | 123.0 |
| 90/10 a Comparative | 3.60 | 2.22 | 1670 | 35.7 | 125.2 |
| 80/20 a Comparative | 3.44 | 2.11 | 1875 | 34.6 | 125.5 |
| 70/30 a Comparative | 4.77 | 2.78 | 2145 | 39.5 | 125.0 |
| 90/10 a | 3.60 | 2.22 | 1670 | 27.8 | 126.0 |
| 80/20 a | 3.44 | 2.11 | 1875 | 24.6 | 126.6 |
| 70/30 a | 4.77 | 2.78 | 715 | 38.0 | 125.0 |
| 70/30 a | 4.77 | 2.78 | 2145 | 26.0 | 126.8 |
| 95/5 b | — | — | 525 | 39.2 | 124.8 |
| 90/10 b | — | — | 555 | 38.2 | 125.2 |
| 85/15 b | — | — | 590 | 39.0 | 124.8 |
| 80/20 b | — | — | 625 | 38.6 | 124.7 |
| 70/30 b | — | — | 715 | 38.2 | 124.8 |
| 50/50 b | — | — | 1000 | 35.2 | 125.2 |
| 95/5 b | — | — | 1580 | 30.9 | 126.4 |
| 90/10 b | — | — | 1665 | 31.0 | 126.4 |
| 85/15 b | — | — | 1765 | 28.8 | 126.6 |
| 80/20 b | — | — | 1875 | 27.8 | 126.8 |
| 70/30 b | — | — | 2145 | 25.0 | 127.0 |
| 50/50 b | — | — | 3000 | 27.7 | 126.9 |
| 70/30 b Comparative | — | — | 715 | 48.6 | 122.3 |
| 70/30 b Comparative | — | — | 2145 | 41.4 | 124.4 |
| 70/30 c | — | — | 715 | 38.0 | 124.8 |
| 70/30 c | — | — | 2145 | 25.0 | 127.0 |
| 70/30 c Comparative | — | — | 715 | 49.9 | 122.0 |
| 70/30 c Comparative | — | — | 2145 | 43.6 | 124.4 |

Surprisingly, the inventive small particle-size samples exhibited drastic increases over peak crystallization temperatures and noticeable reductions in haze levels when compared to plaques produced with the nucleator alone, whether physically treated to reduce particle size or not. Furthermore, it is evident that high-intensity mixing provides improvements over low-intensity mixing in these characteristics as well and the addition of the anticaking agent within the molten thermoplastic during manufacture unexpectedly provided similar results within the ultimate article. Thus, one embodiment of this invention basically requires the presence of small particle-size bicyclic nucleator compounds alone or in combination with co-milled or co-spray dried anticaking agents, or separately introduced anticaking agents within the thermoplastic manufacturing process in order to provide unexpectedly good improvements in physical and optical properties within ultimately produced thermoplastic articles, with the co-milled powders and high-intensity resin blending procedures providing the optimum results (particularly at 80/20 nucleator to anticaking agent ratios). Furthermore, the inventive co-milled and co-spray dried small particle size powders of the inventive nucleator/anticaking agent formulations provide unexpectedly improved physical properties within the stored powders in terms of cementation and growth (although the presence of anticaking agents alone appear to provide benefits in such an instance and thus small particle sizes are not always required).

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. An additive formulation comprising:
   (a) at least one nucleating compound conforming to the structure of Formula (I)

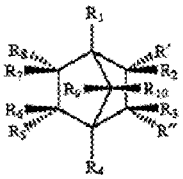

(I)

wherein $R_1$, $R_2$, $R_3$, $R_4$, $R_5$, $R_6$, $R_7$, $R_8$, $R_9$, and $R_{10}$ are independently selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogen, phenyl, alkylphenyl, and geminal or vicinal carbocyclic having up to nine carbon atoms;

wherein R' and R" are the same or different and are individually selected from the group consisting of hydrogen, $C_1$-$C_{30}$ alkyl, hydroxy, amine, polyamine, polyoxyamine, $C_1$-$C_{30}$ alkylamine, phenyl, halogen, $C_1$-$C_{30}$ alkoxy, $C_1$-$C_{30}$ polyoxyalkyl, and esters; and wherein said nucleating compound is provided in the form of particles, said particles having a D95 size range of less than or equal to 94 micrometers at a mean volume diameter (MVD) of about 16; and (b) an anticaking agent, said anti-caking agent comprising one or more substances selected from the group consisting of: silica gel; talc; dihydrotalcite; and metal carboxylates; and wherein said anticaking agent is provided in a weight ratio of anticaking agent to nucleating compound of from about 10:90 to about 30:70.

2. An additive formulation, wherein said additive formulation comprises in part:
(a) an anti-caking agent and
(b) a nucleating compound, wherein said nucleating compound conforms to the structure of:

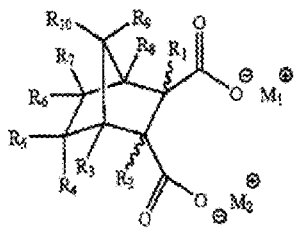

wherein $M_1$ and $M_2$ are the same or different and are independently selected from the group consisting of metal cations; and
$R_1, R_2, R_3, R_4, R_5, R_6, R_7, R_8, R_9$, and $R_{10}$ are independently selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogen, phenyl, alkylphenyl, and $C_1$-$C_9$ carbocyclic
wherein said metal cations are selected from the group consisting of calcium, strontium, barium, magnesium, aluminum, silver, sodium, lithium, rubidium, and potassium
wherein said nucleating compound is provided in the form of particles, said particles having a D95 size range of less than or equal to 94 micrometers at a mean volume diameter (MVD) of about 16; and
wherein said anti-caking agent comprises one or more substances selected from the group consisting of: silica gel; talc, dihydrotacite; and metal carboxylates; and
wherein said anti-caking agent is provided in a weight ratio of anti-caking agent to nucleating compound of from about 10:90 to about 30:70.

3. The additive formulation of claim 2 wherein said metal cation is calcium.

4. The additive formulation of claim 2 wherein said metal cation comprises sodium.

5. The additive formulation of claim 2 wherein said anti-caking agent comprises a silica gel.

6. A thermoplastic article comprising the additive formulation of claim 1, said article further comprising at least one polyolefin.

7. A thermoplastic article comprising the additive formulation of claim 2, said article further comprising at least one polyolefin.

8. The additive formulation of claim 2 wherein said nucleating compound comprises disodium[2.2.1]heptane-2,3-dicarboxylate.

9. The additive formulation of claim 5 wherein said nucleating compound comprises disodium[2.2.1]heptane-2,3-dicarboxylate.

10. The additive formulation of claim 1 wherein said particles comprise a D95 size of less than or equal to about 10 microns at a mean volume diameter (MVD) of 7.5.

11. The additive formulation of claim 10 wherein said nucleating compound and anticaking agent are provided in a ratio of nucleating compound to anticaking agent of about 80:20.

12. The additive formulation of claim 2 wherein said nucleating compound and anticaking agent are provided in a ratio of nucleating compound to anticaking agent of about 80:20.

* * * * *